United States Patent
Kim et al.

(10) Patent No.: US 9,702,708 B2
(45) Date of Patent: Jul. 11, 2017

(54) VEHICLE NAVIGATION SYSTEM, METHOD FOR CONTROLLING VEHICLE NAVIGATION SYSTEM, AND VEHICLE BLACK BOX

(75) Inventors: Heungwon Kim, Seoul (KR); Seungwan Woo, Seoul (KR); Wonkeun Lee, Gwangmyung-si (KR); Haeil Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 641 days.

(21) Appl. No.: 13/519,688

(22) PCT Filed: Mar. 2, 2011

(86) PCT No.: PCT/KR2011/001418
§ 371 (c)(1),
(2), (4) Date: Aug. 15, 2012

(87) PCT Pub. No.: WO2011/108835
PCT Pub. Date: Sep. 9, 2011

(65) Prior Publication Data
US 2012/0323490 A1    Dec. 20, 2012

(30) Foreign Application Priority Data
Mar. 3, 2010 (KR) ........................ 10-2010-0019079

(51) Int. Cl.
*G01C 21/26* (2006.01)
*G01C 21/36* (2006.01)

(52) U.S. Cl.
CPC ......... *G01C 21/26* (2013.01); *G01C 21/3602* (2013.01)

(58) Field of Classification Search
CPC ....................................................... G01C 21/26
USPC ........................................................ 701/488
See application file for complete search history.

(56) References Cited

U.S. PATENT DOCUMENTS

| | | | | |
|---|---|---|---|---|
| 5,983,161 A | * | 11/1999 | Lemelson et al. | 701/301 |
| 6,018,697 A | * | 1/2000 | Morimoto et al. | 701/411 |
| 2006/0195366 A1 | * | 8/2006 | Clayton et al. | 705/26 |
| 2008/0018497 A1 | * | 1/2008 | Farnham | 340/995.1 |
| 2008/0033634 A1 | * | 2/2008 | Lee et al. | 701/201 |
| 2008/0051957 A1 | * | 2/2008 | Breed et al. | 701/36 |
| 2008/0097665 A1 | * | 4/2008 | Bentele et al. | 701/36 |
| 2008/0275636 A1 | * | 11/2008 | Hirose | 701/201 |

(Continued)

FOREIGN PATENT DOCUMENTS

| | | |
|---|---|---|
| KR | 10-2007-0099112 | 10/2007 |
| KR | 10-2009-0121791 | 11/2009 |
| WO | 2006/049750 | 5/2006 |

*Primary Examiner* — Yonel Beaulieu
*Assistant Examiner* — Martin Weeks

(57) ABSTRACT

Disclosed are a vehicle navigation system and a method for controlling a vehicle navigation system. The vehicle navigation system of the present invention comprises: a storage unit; a communication unit for receiving image data mapped with route guidance information from a vehicle black box provided in a vehicle; and a control unit for storing the received image data in a storage unit. The present invention can utilize the image data mapped with the route guidance information as reference data for determining details of an accident by storing the image data mapped with the route guidance information to confirm information including a destination of a driver of an accident vehicle when an accident happens.

26 Claims, 21 Drawing Sheets

(56) References Cited

U.S. PATENT DOCUMENTS

2009/0172527 A1    7/2009  Buecker et al.
2010/0082246 A1*   4/2010  Crane .......................... 701/209
2010/0114471 A1*   5/2010  Sugiyama et al. ............ 701/200
2010/0289922 A1*  11/2010  Brenner et al. .......... 348/231.99

* cited by examiner

FIG. 8

```
First guide route
├── Image file 1
:
└── Image file 1
```
(a)

```
Second guide route
├── Segment A
:
└── Segment M
    ├── Image file 1
    :
    └── Image file N
```
(b)

```
Third guide route
├── Segment A
│   └── Image file 1
:
└── Segment M
    └── Image file N
```
(c)

```
Fourth guide route
├── Time A
:
└── Time M
    ├── Image file 1
    :
    └── Image file N
```
(d)

VEHICLE NAVIGATION SYSTEM, METHOD FOR CONTROLLING VEHICLE NAVIGATION SYSTEM, AND VEHICLE BLACK BOX

CROSS REFERENCE TO RELATED APPLICATIONS

This statement is the U.S. national phase application of PCT/KR2011/001418, filed Mar. 2, 2011, which claims priority to Korean application no. 10-2010-0019079, filed Mar. 3, 2010. The contents of the aforementioned applications are incorporated herein by reference.

TECHNICAL FIELD

The present invention relates to a navigation system, and more particularly, to a vehicle navigation apparatus, a method of controlling of a vehicle navigation apparatus, and a vehicle black box.

BACKGROUND ART

With the popularization of Internet and modification of location information related laws, location based service (LBS) related industries are activated. As one of location based services, a vehicle navigation service that measures a current location of a vehicle or guides a route to a destination is also rapidly activated.

In order to determine a negligence ratio in an accident occurring when a vehicle stops or runs, objective data is needed in many cases. Accordingly, a vehicle black box capable of providing the objective data is used. However, a conventional vehicle black box provides only simple and superficial information about a vehicle state and cannot effectively meet the demands of users.

DETAILED DESCRIPTION OF THE INVENTION

Technical Problems

An object of the present invention is to provide a vehicle navigation apparatus, a method of controlling a vehicle navigation apparatus, and a vehicle black box that map image data to route guidance information and that provide the image data to a user.

Technical Solutions

According to an aspect of the present invention, a vehicle navigation apparatus includes: a storage unit; a communication unit for receiving image data mapped to route guidance information from a vehicle black box mounted in a vehicle; and a controller for storing the received image data at the storage unit.

According to another aspect of the present invention, a vehicle black box includes: a storage unit; a communication unit for receiving route guidance information from a vehicle navigation apparatus mounted in a vehicle; and a controller for mapping image data acquired by photographing the inside and the outside of the vehicle to the received route guidance information and storing the image data at the storage unit.

According to another aspect of the present invention, a method of controlling a vehicle navigation apparatus, the method includes: receiving image data mapped to guidance route information from a vehicle black box mounted in a vehicle; storing the received image data; and outputting the route guidance information mapped to the received image data.

According to another aspect of the present invention, a computer readable recording medium records a program for executing in a computer using one of the methods.

Advantageous Effects

In a navigation system, a method of controlling a vehicle navigation apparatus, and a vehicle black box according to the present invention, as image data is mapped to route guidance data and is stored, when a vehicle accident occurs, information of a destination of a driver of the accident vehicle can be determined and thus the image data can be used as a reference material for determining details of the accident.

When the vehicle deviates from a route, route guidance information includes re-route guidance information acquired by re-searching and thus a guide route before and after being deviated from the route can be determined. Accordingly, the vehicle may enter a wrong route and re-search for the route, but due to another business while moving to a destination, even when the vehicle goes another destination, the route may be re-searched for, and thus when a vehicle accident occurs, the image data can be used as a reference material for determining details of the accident.

Further, because route guidance information and trace information is output together, an actual moving trace of the vehicle as well as information such as a destination of the driver can be determined.

BRIEF DESCRIPTION OF THE DRAWINGS

FIG. 8 is a diagram illustrating operation of storing image data according to an embodiment of the present invention;

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. The same reference numbers will be used throughout this specification to refer to the same or like parts. In the following description of the present invention, a detailed description of known functions and configurations incorporated herein will be omitted when it may obscure the subject matter of the present invention. Further, numerals (e.g. first, second, etc.) used to describe the present invention are merely identifiers for discriminating one component from other components.

A navigation system according to the present invention will now be described in detail with reference to the attached drawings. The terms "module" and "part" used to signify components are used herein to help the understanding of the components and thus they should not be considered as having specific meanings or roles.

Figure 1:
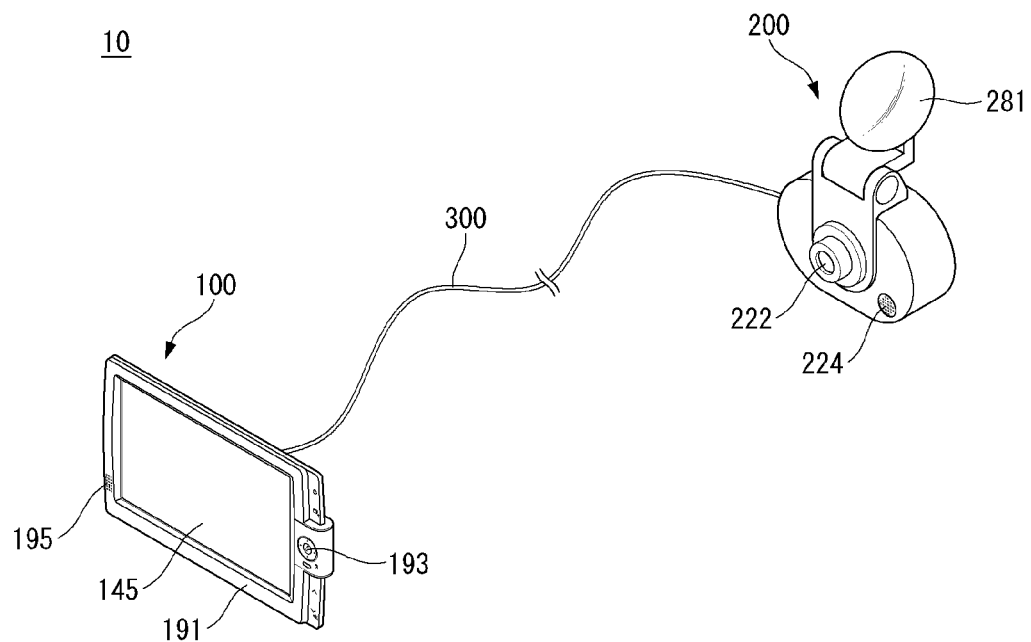
FIG. 1 is a perspective view illustrating a navigation system according to an embodiment of the present invention.

FIG. 1 is a perspective view illustrating a navigation system according to an embodiment of the present invention.

As shown in FIG. 1, a navigation system 10 according to an embodiment of the present invention includes a vehicle navigation apparatus 100 and a vehicle black box 200.

The navigation system 10 is a system that notifies a driver and a fellow passenger of a vehicle of various data related to driving and maintenance of the vehicle. The navigation system 10 may be the vehicle navigation apparatus 100 as a narrow meaning and may include various electronic devices that operate in interlock with the vehicle navigation apparatus 100 using wired and wireless as a wide meaning. That is, by connecting various electronic devices that can supplement and enhance a function of the vehicle navigation apparatus 100 to the vehicle navigation apparatus 100, an integrated navigation system 10 may be formed. An electronic device that may form the navigation system 10 by interlocking with the vehicle navigation apparatus 100 may be a mobile terminal and a remote control that can connect to a mobile communication network. Further, an electronic device connected to the vehicle navigation apparatus 100 to form the navigation system 10 may include the vehicle black box 200. The vehicle black box 200 may be provided integrally with or separately from the vehicle navigation apparatus 100. That is, in FIG. 1, the vehicle black box 200 provided separately from the vehicle navigation apparatus 100 is connected through a communication cable 300, but the vehicle black box 200 may be formed integrally with the vehicle navigation apparatus 100.

The vehicle navigation apparatus 100 includes a display unit 145, a navigation manipulating key 193, and a navigation microphone 195 provided at a front surface of a navigation housing 191.

The navigation housing 191 forms an external appearance of the vehicle navigation apparatus 100. The vehicle navigation apparatus 100 may be exposed to an environment of various conditions such as exposure to a high temperature or a low temperature due to a seasonal factor and a direct/indirect outside impact. The navigation housing 191 has a purpose of protecting various electronic components within the vehicle navigation apparatus 100 from a change of an outside environment and enhancing an external appearance of the vehicle navigation apparatus 100. In order to achieve such a purpose, the navigation housing 191 may be formed by injection molding an element such as ABS, PC, or engineering plastic having reinforced strength.

The display unit 145 is an element that visually displays various data. Various data displayed in the display unit 145 may be map data to which route data is coupled, various broadcasting screens including DMB broadcasting, or an image stored at a memory. The display unit 145 may be physically or logically divided into several pieces. In the physically divided display unit 145, two or more display units 145 are adjacently provided. In the logically divided display unit 145, a plurality of independent screens are displayed in a physically single display unit 145. For example, while receiving and displaying DMB broadcasting, route information may be displayed in a partial area of the display unit 145, or DMB broadcasting and a map screen may be displayed in a partial area and another area, respectively, of the display unit 145. According to a tendency in which various functions are converged to the vehicle navigation apparatus 100, a case of logically dividing the display unit 145 and displaying various data gradually increases. Furthermore, in order to display various data, the display unit 145 gradually has a large screen.

An entire surface or a portion of the display unit 145 may be a touch screen that can receive a user's touch input. For example, by touching a function selection button displayed in the display unit 145, a function thereof may be activated. That is, the display unit 145 may be an input unit (120 of FIG. 3) while being an output unit of an image (140 of FIG. 3).

A navigation manipulating key 193 is provided to execute various functions of the vehicle navigation apparatus 100 or to enable a user to directly input necessary data. By mapping a frequently using specific function to the navigation manipulating key 193, use convenience can be improved.

The navigation microphone 195 is provided to receive a voice and sound. For example, a specific function of the vehicle navigation apparatus 100 may be executed based on a voice signal received by the navigation microphone 195. Further, a present state of the vehicle such as occurrence of an accident may be detected based on a sound signal received by the navigation microphone 195.

The vehicle black box 200 stores data necessary for an accident processing process of the vehicle by exchanging a signal with the vehicle navigation apparatus 100. For example, when an accident occurs while driving the vehicle, by analyzing image data in which the vehicle black box 200 acquires, the image data may be used for determining details and a negligence ratio of the accident. Further, the vehicle black box 200 connected to the vehicle navigation apparatus 100 may use various data stored at the vehicle navigation apparatus 100. For example, by mapping an image acquired from the vehicle black box 200 to map data stored at the vehicle navigation apparatus 100, effectiveness of the vehicle black box 200 may increase.

The vehicle black box 200 acquires vehicle data while driving and stopping the vehicle. That is, the vehicle black box 200 may photograph an image while driving the vehicle and photograph an image even when the vehicle stops. A picture quality of an image acquired through the vehicle black box 200 may be constant or be changed. For example, before and after an accident occurs, by increasing a picture quality of an image, and in a normal case, by decreasing a picture quality of an image, while minimizing requested storage space, a central image may be stored.

The vehicle black box 200 includes a black box camera 222, a black box microphone 224, and an attachment portion 281.

The black box camera 222 may photograph the outdoor or the indoor of the vehicle. Further, the black box camera 222 may be provided in the singular number or the plural number. When a plurality of black box cameras 222 exist, one black box camera 222 is formed integrally with the vehicle black box 200, and the remaining black box cameras 222 transmit an image photographed with attached to each portion of the vehicle to the vehicle black box 200. When a single black box camera 222 exists, the black box camera 222 is installed to photograph the front of the vehicle. An image photographed by the black box camera 222 is stored at the vehicle black box 200 or the vehicle navigation apparatus 100.

The black box microphone 224 acquires sound generating in the inside and the outside of the vehicle. The black box microphone 224 performs a function similar to that of the navigation microphone 195.

The attachment portion 281 fixes the vehicle black box 200 to the vehicle. The attachment portion 281 may be an absorption plate that can attach the vehicle black box 200 to front glass of the vehicle or a fixing device that can couple the vehicle black box 200 to a room mirror of the vehicle.

Figure 2:
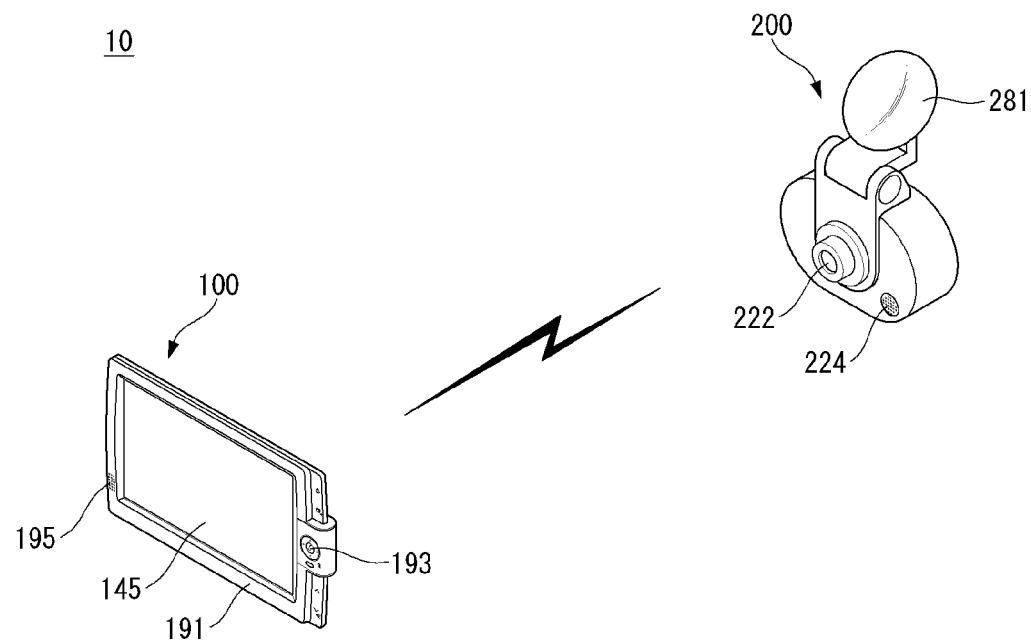
FIG. 2 is a perspective view illustrating a navigation system according to another embodiment of the present invention.

FIG. 2 is a perspective view illustrating a navigation system according to another embodiment of the present invention, and in FIG. 2, only a portion different from an embodiment of the present invention will be described.

A navigation system 10 according to another embodiment of the present invention connects a vehicle navigation apparatus 100 and a vehicle black box 200 using wireless. That is, the vehicle navigation apparatus 100 and the vehicle black box 200 are separate devices, and a physical connection device may not exist between the vehicle navigation apparatus 100 and the vehicle black box 200. The vehicle navigation apparatus 100 and the vehicle black box 200 communicate through Bluetooth, Radio Frequency Identification (RFID), Infrared Data Association (IrDA), Ultra Wideband (UWB), and ZigBee.

Figure 3:
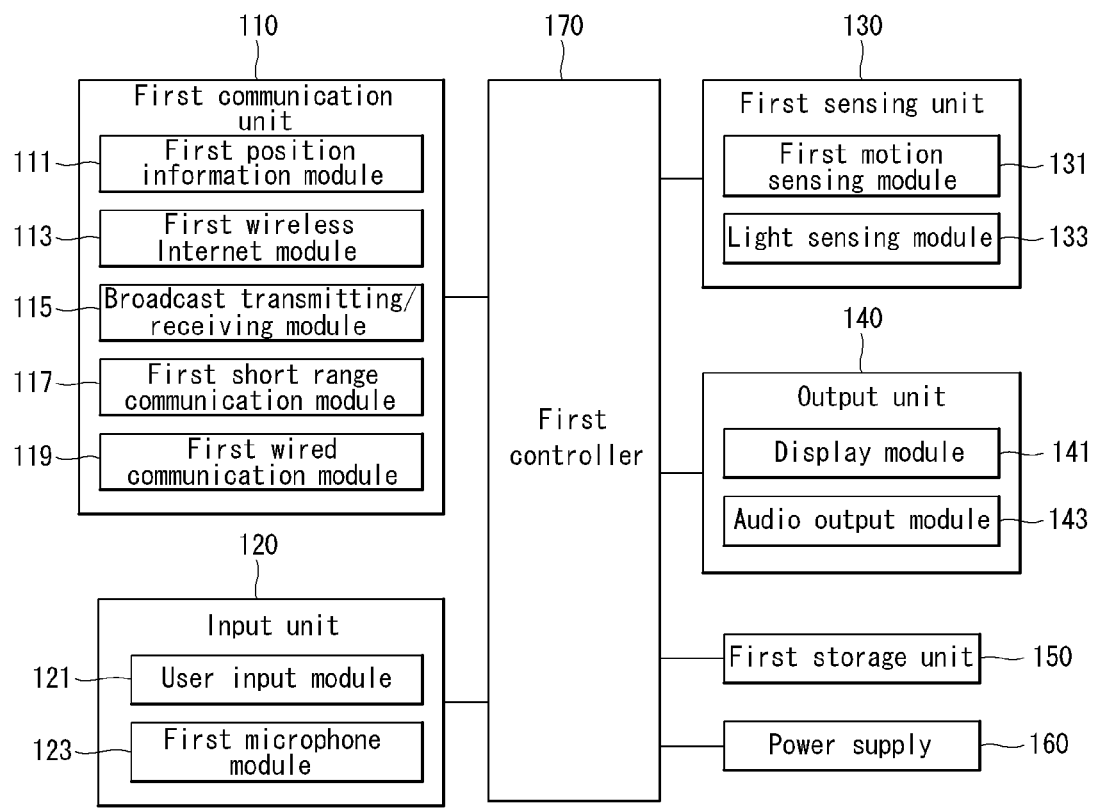
FIG. 3 is a block diagram illustrating a configuration of a vehicle navigation apparatus of FIG. 1.

FIG. 3 is a block diagram illustrating a configuration of a vehicle navigation apparatus of FIG. 1.

As shown in FIG. 3, the vehicle navigation apparatus 100 according to an embodiment of the present invention includes a first communication unit 100, an input unit 120, a first sensing unit 130, an output unit 140, a first storage unit 150, a power supply 160, and a first controller 170.

The first communication unit 100 is provided to enable the vehicle navigation apparatus 100 to communicate with another device. The first communication unit 100 includes a first position information module 111, a first wireless Internet module 113, a broadcast transmitting/receiving module 115, a first short range communication module 117, and a first wired communication module 119.

The first position information module 111 is a device that acquires position information through a Global Navigation Satellite System (GNSS). The GNSS is a navigation system that can calculate a position of a receiving terminal using an electric wave signal that detailed example of the GNSS may be a Global Positioning System (GPS), Galileo, a Global Orbiting Navigational Satellite System (GLONASS), a COMPASS, an Indian Regional Navigational Satellite System (IRNSS), and a Quasi-Zenith Satellite System (QZSS) according to an operation subject thereof. The first position information module 111 of the vehicle navigation apparatus 100 according to an embodiment of the present invention receives a GNSS signal servicing in a use area of the vehicle navigation apparatus 100, thereby acquiring position information.

The first wireless Internet module 113 is a device that acquires or transmits information by connecting to wireless Internet. Wireless Internet that can connect through the first wireless Internet module 113 may be a wireless LAN (WLAN), a wireless broadband (Wibro), world interoperability for microwave access (Wimax), and High Speed Downlink Packet Access (HSDPA).

The broadcast transmitting/receiving module 115 is a device that transmits and receives a broadcasting signal through various broadcasting systems. A broadcasting system that can transmit and receive through the broadcast transmitting/receiving module 115 may be Digital Multimedia Broadcasting Terrestrial (DMBT), a Digital Multimedia Broadcasting Satellite (DMBS), Media Forward Link only (MediaFLO), Digital Video Broadcast Handheld (DVBH), and Integrated Services Digital Broadcast Terrestrial (IS-DBT). A broadcasting signal transmitted and received through the broadcast transmitting/receiving module 115 includes traffic information, living information, and an image photographed in the vehicle black box (200 of FIG. 1).

The first short range communication module 117 is a device for short range communication. As described above, the first short range communication module 117 communicates through Bluetooth, Radio Frequency Identification (RFID), Infrared Data Association (IrDA), Ultra WideBand (UWB), and ZigBee.

The first wired communication module 119 is an interface device that can connect the vehicle navigation apparatus 100 to another device using a wire. The first wired communication module 119 may be an USB module that can communicate through an USB port. The vehicle navigation apparatus 100 according to an embodiment and another embodiment of the present invention communicates with another device through the first short range communication module 117 or the first wired communication module 119, as needed. Furthermore, when communicating with a plurality of devices, one device may communicate with the first short range communication module 117, and another device may communicate through the first wired communication module 119.

The input unit 120 is a device that converts a physical input from the outside of the vehicle navigation apparatus 100 to a specific electric signal. The input unit 120 includes a user input module 121 and a first microphone module 123.

The user input module 121 is a key input device that enables a user to input through a push action. The user input module 121 may be embodied as a navigation manipulating key (193 of FIG. 1) provided at the outside of a housing (191 of FIG. 1) of the vehicle navigation apparatus 100.

The first microphone module 123 is a device that receives a user voice and sound generated at the inside and the outside of the vehicle. The first microphone module 123 may be embodied as a navigation microphone 195 provided at the outside of the housing (191 of FIG. 1) of the vehicle navigation apparatus 100.

The first sensing unit 130 is a device that can detect a present state of the vehicle navigation apparatus 100. The first sensing unit 130 includes a first motion sensing module 131 and a light sensing module 133.

The first motion sensing module 131 detects a motion in three-dimensional space of the vehicle navigation apparatus 100. The first motion sensing module 131 includes a three-axis terrestrial magnetic sensor and a three-axis acceleration sensor. By coupling motion information that acquires through the first motion sensing module 131 to position information that acquires through the position information module 111, a more accurate trace of the vehicle that attaches the vehicle navigation apparatus 100 may be calculated.

The light sensing module 133 is a device that measures peripheral illuminance of the vehicle navigation apparatus 100. The light sensing module 133 may change brightness of the display unit 145 to correspond to peripheral brightness using illumination information that acquires through the light sensing module 133.

The output unit 140 is a device that enables the vehicle navigation apparatus 100 to output information. The output unit 140 includes a display module 141 and an audio output module 143.

The display module 141 is a device that outputs information in which a human can visually recognize in the vehicle navigation apparatus 100. The display module 141 may be embodied as the display unit (145 of FIG. 1) provided at a front surface of the housing (191 of FIG. 1) of the vehicle navigation apparatus 100. When the display module 141 is a touch screen, the display module 141 performs a function of the input unit 120 while being the output unit 140 of data.

The audio output module 143 is a device that outputs data in which a human can aurally recognize in the vehicle navigation apparatus 100. The audio output module 143 may be embodied as a speaker that expresses data in which the vehicle navigation apparatus 100 should notify to a user including a driver with sound.

The first storage unit 150 is a device that stores data generated by data and operation necessary for operating the vehicle navigation apparatus 100. The first storage unit 150 may be a memory provided at the inside of the vehicle navigation apparatus 100, or a detachable memory. Data necessary for operating the vehicle navigation apparatus 100 may include an operating system (OS), a route search application, and a map. Further, data generated by operation of the vehicle navigation apparatus 100 may be found route information and a received image.

The power supply 160 is a device that supplies power necessary for operation of the vehicle navigation apparatus 100 or operation of another device connected to the vehicle navigation apparatus 100. The power supply 160 is a device that receives supply of power from a battery provided within the vehicle navigation apparatus 100 or external power such as a vehicle. Further, the power supply 160 may be embodied as the first wired communication module 119 or may be a device that receives supply of power using wireless according to a form that receives supply of power.

The first controller 170 is a device that outputs a control signal of controlling various operations of the vehicle navigation apparatus 100. Furthermore, the first controller 170 may output a control signal of controlling another device connected to the vehicle navigation apparatus 100.

Figure 4:
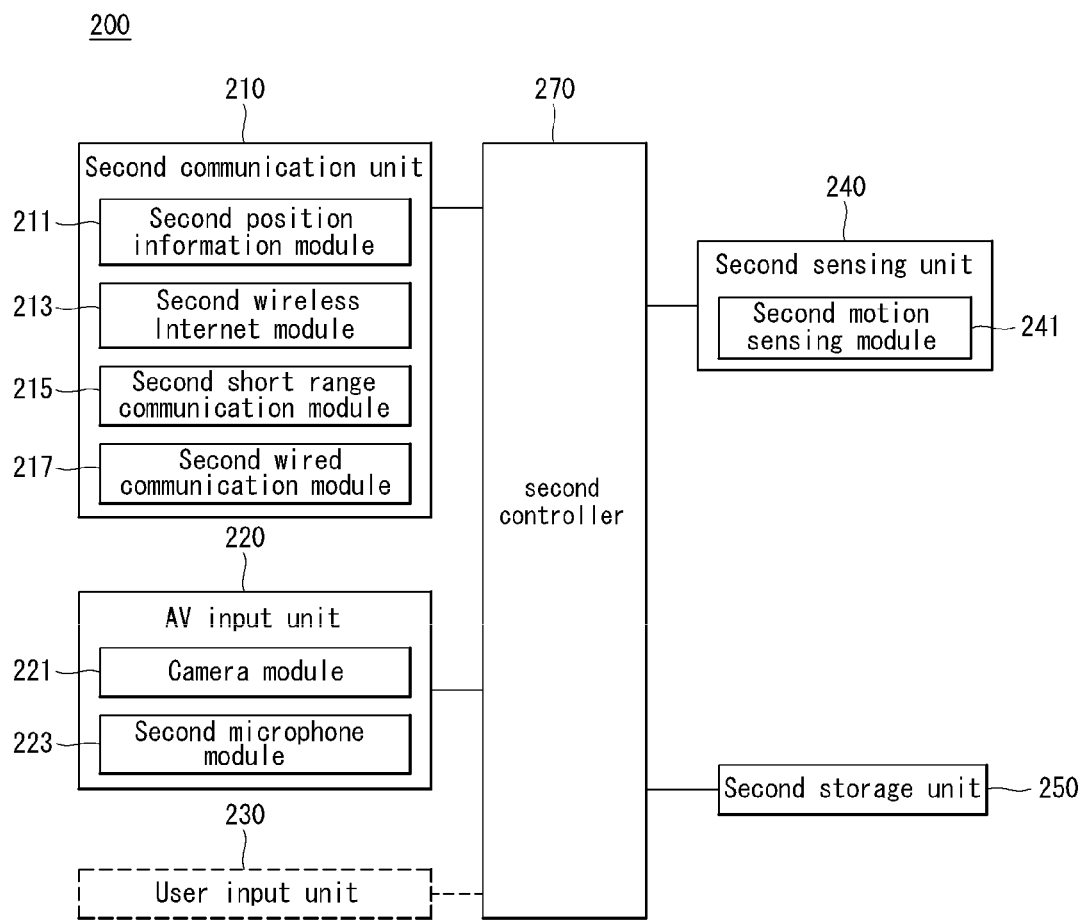
FIG. 4 is a block diagram illustrating a configuration of a vehicle black box of FIG. 1.

FIG. 4 is a block diagram illustrating a configuration of a vehicle black box of FIG. 1.

As shown in FIG. 4, the vehicle black box 200 according to an embodiment of the present invention includes a second communication unit 210, an AV input unit 220, a user input unit 230, a second sensing unit 240, and a second storage unit 250.

The second communication unit 210 is a device that can communicate with the first communication unit 110 or another device of the vehicle navigation apparatus (100 of FIG. 3). The second communication unit 210 includes a second position information module 211, a second wireless Internet module 213, a second short range communication module 215, and a second wired communication module 217. The second position information module 211 and the second wireless Internet module 213 perform operation similar to that of the first position information module (111 of FIG. 3) and the first wireless Internet module (113 of FIG. 3), respectively. The second short range communication module 215 communicates with the first short range communication module (117 of FIG. 3), and the second wired communication module 217 communicates with the first wired communication module 119.

The AV input unit 220 is a device that can acquire sound and an image. The AV input unit 220 includes a camera module 221 and a second microphone module 223.

The camera module 221 acquires an image of the inside and the outside of the vehicle in which the vehicle black box 200 is mounted. The camera module 221 may be embodied as the black box camera (222 of FIG. 1), as described above.

The second microphone module 223 acquires sound generated at the inside and the outside of the vehicle. The sound acquired through the second microphone module 223 may be used for controlling operation of the vehicle black box 200. For example, when sound stronger than that of ordinary times is received through the second microphone module 223, the camera module 221 may acquire an image of a higher resolution. The second microphone module 223 may be embodied as the black box microphone 224.

The user input unit 230 is a device provided to enable the user to directly manipulate operation of the vehicle black box 200. The user input unit 230 may be embodied as a push button (not shown) provided at the outside of the vehicle black box 200. However, when the vehicle black box 200 is controlled by a control signal of the first controller (170 of FIG. 3) of the vehicle navigation apparatus (100 of FIG. 3), the user input unit 230 may be excluded from the vehicle black box 200.

The second sensing unit 240 is a device that can detect a present state of the vehicle black box 200. The second sensing unit 240 may include a second motion sensing module 241, and the second sensing unit 240 performs operation similar to that of the first motion sensing module (131 of FIG. 3), except for an installed position. When the second sensing unit 240 is provided in the vehicle black box 200, the second sensing unit 240 may not receive data related to a motion of three-dimensional space from the vehicle navigation apparatus 100.

The second storage unit 250 is a device that stores data generated by data and operation necessary for operation of the vehicle black box 200. Data stored at the second storage unit 250 may be an image acquired through the camera module 221. The second storage unit 250 may be a memory provided within the vehicle black box 200, or detachable from the vehicle black box 200.

The second controller 270 is a device that outputs a control signal of controlling various operations of the vehicle black box 200. The second controller 270 may be affected by a control signal of the first controller (170 of FIG. 3) of the vehicle navigation apparatus (100 of FIG. 3). That is, the second controller 270 may be dependent on the first controller 170.

Figure 5:
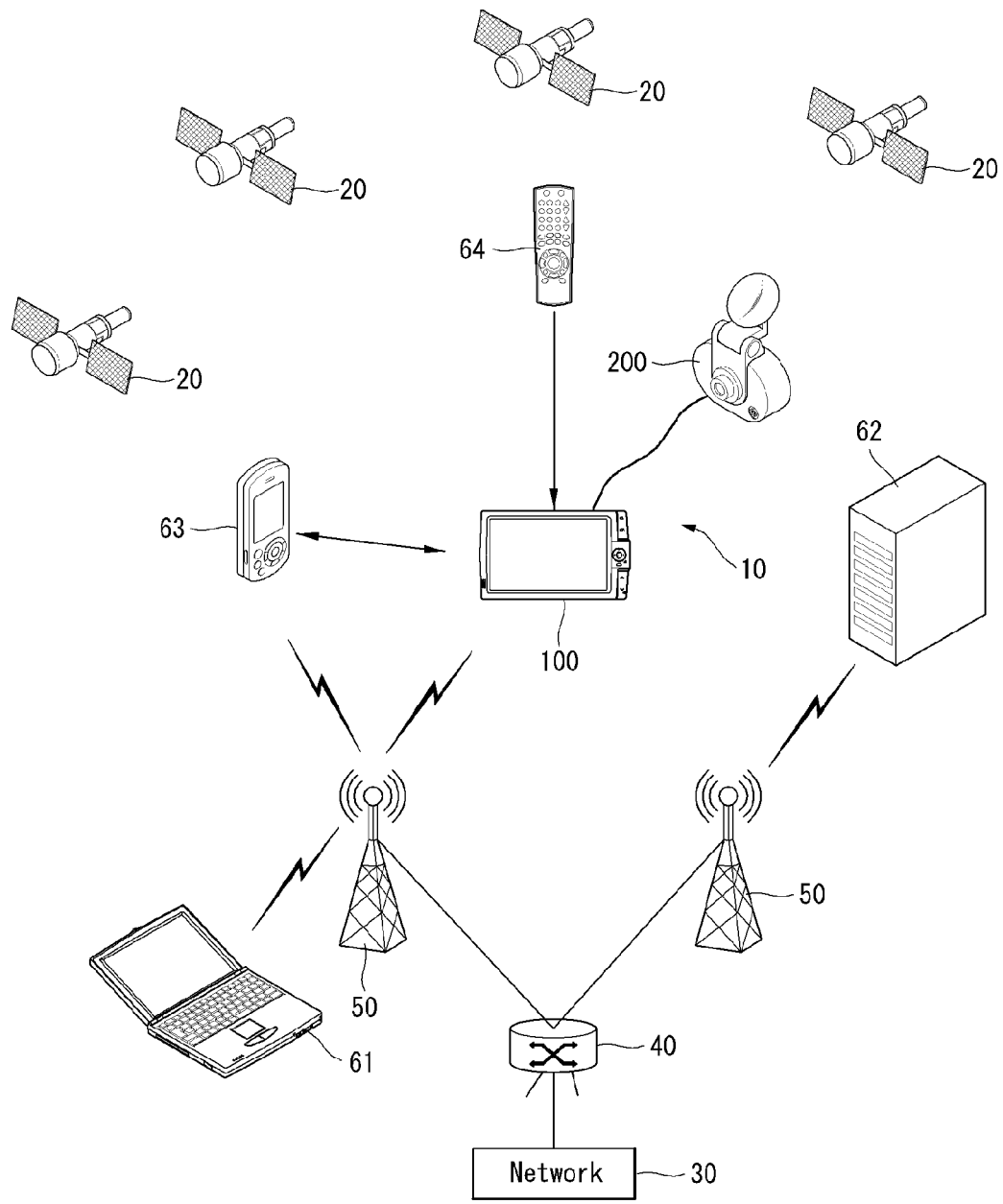
FIG. 5 is a diagram illustrating a communication network including the navigation system of FIG. 1.

FIG. 5 is a diagram illustrating a communication network including the navigation system of FIG. 1.

As shown in FIG. 5, the navigation system 10 according to an embodiment of the present invention may be connected to various communication networks and other electronic devices 61 to 64.

The navigation system 10 calculates a present position using an electric wave signal that receives from the artificial satellite 20. Each artificial satellite 20 may transmit an L band frequency having different frequency bands. The navigation system 10 calculates a present position based on a time consumed when an L band frequency transmitted from each artificial satellite 20 arrives the navigation system 10.

The navigation system 10 connects using wireless to the network 30 via the controller 40 (ACR) and the base station 50 (RAS) through the first communication unit (110 of FIG. 3) and the second communication unit (210 of FIG. 4). When the navigation system 10 connects to the network 30, by indirectly connecting to electronic devices 61 and 62 connected to the network 30, data may be exchanged.

The navigation system 10 may be indirectly connected to the network 30 through another device 63 having a communication function. For example, when a device that may be connected to the network 30 is not provided in the navigation system 10, the navigation system 10 may communicate with another device 63 having a communication function through the first short range communication module (117 of FIG. 3) and the second short range communication module (215 of FIG. 4).

Hereinafter, operation of outputting route guidance information mapped to image data according to an embodiment of the present invention will be described with reference to FIGS. 6 to 9.

Figure 6:
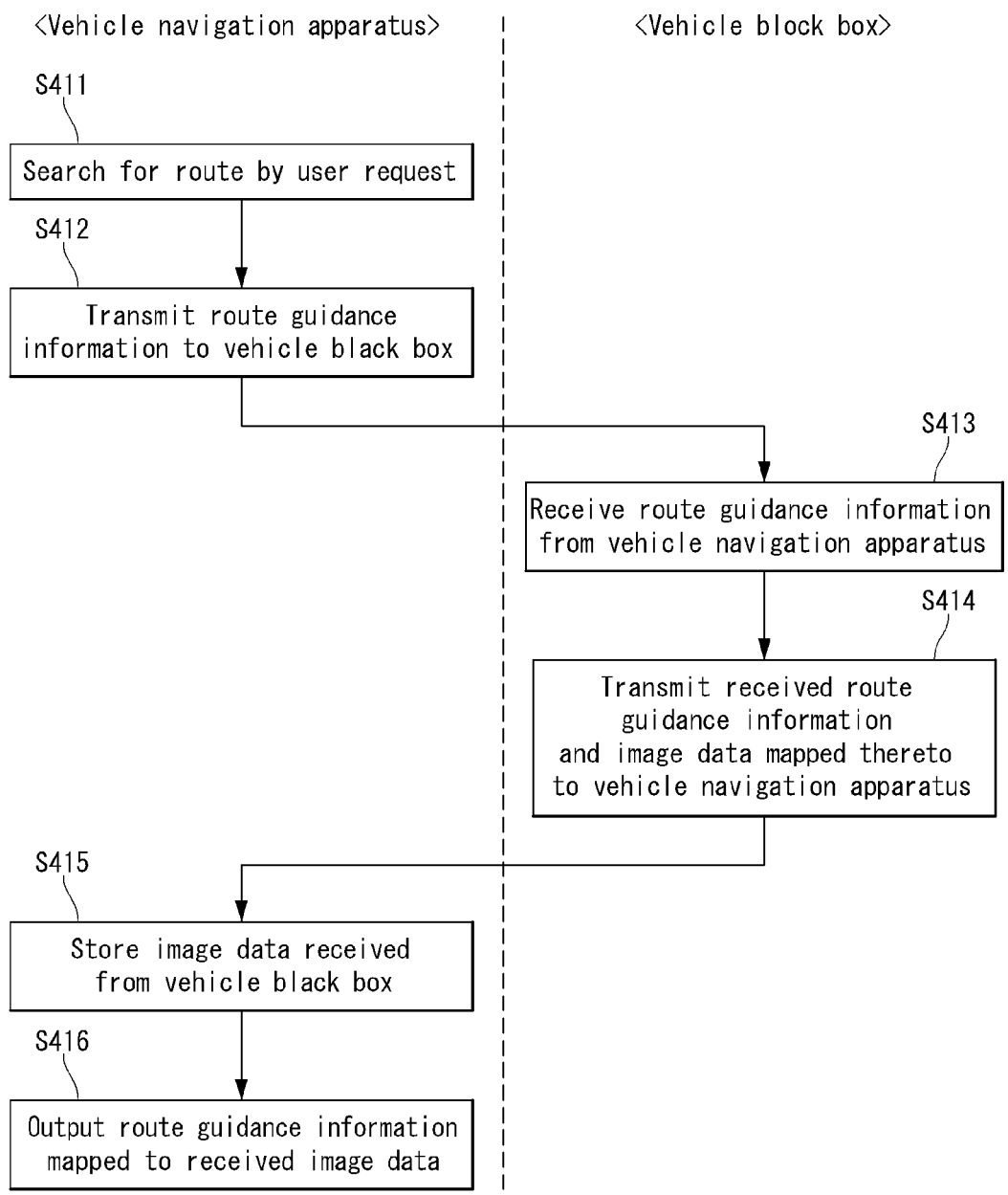
FIG. 6 is a flowchart illustrating operation of outputting route guidance information according to an embodiment of the present invention.
Figure 7:
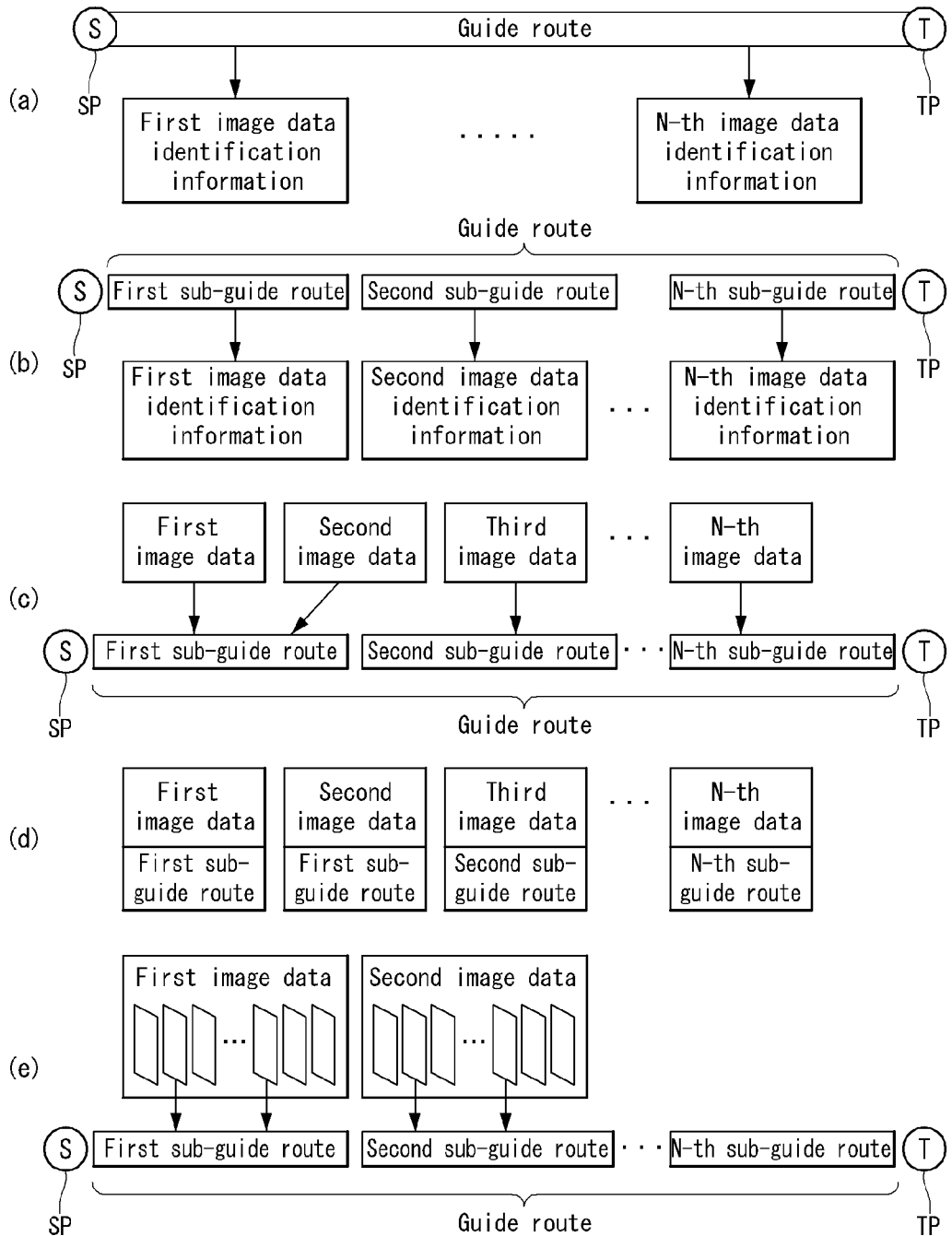
FIG. 7 is a diagram illustrating operation of mapping image data to route guidance information according to an embodiment of the present invention.
Figure 9:
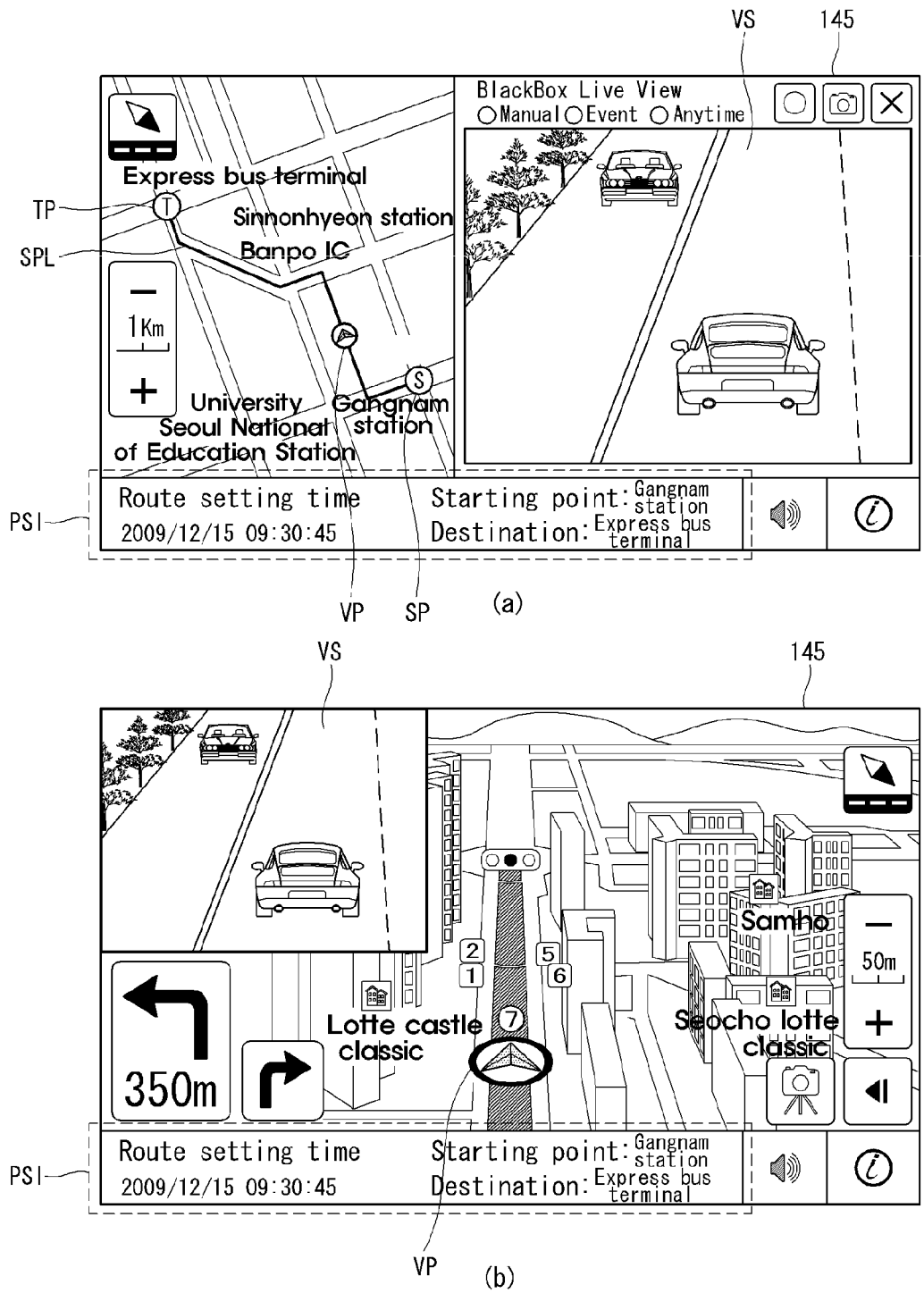
FIG. 9 illustrates an example of a route guidance information output screen according to an embodiment of the present invention.

FIG. 6 is a flowchart illustrating operation of outputting route guidance information according to an embodiment of the present invention, FIG. 7 is a diagram illustrating operation of mapping image data to route guidance information according to an embodiment of the present invention, FIG. 8 is a diagram illustrating operation of storing image data according to an embodiment of the present invention, and FIG. 9 illustrates an example of a route guidance information output screen according to an embodiment of the present invention.

The first controller (170 of FIG. 3) of the vehicle navigation apparatus (100 of FIG. 3) searches for a route by a user request (S411). That is, the first controller (170 of FIG. 3) of the vehicle navigation apparatus (100 of FIG. 3) searches for a route to a destination input by a user using map data stored at the first storage unit (150 of FIG. 3) and thus acquires route guidance information. In the map data, road information such as an express highway and a national road, and road related information such as a one-way road, a no-left turn area, a u-turn area, and a speed limit are stored. In this case, a starting point may be input by a user or may be acquired using present vehicle position information. When an intermediate point is input by the user, a route from a starting point to a destination via the intermediate point may be searched for.

The first controller (170 of FIG. 3) of the vehicle navigation apparatus (100 of FIG. 3) transmits route guidance information to the vehicle black box (200 of FIG. 4) (S412). The route guidance information includes guidance route information from a starting point to a destination, route setting time information, which is a time point to which a route found by a user request is set, and guidance point information such as a starting point, an intermediate point, and a destination.

Thereafter, the second communication unit (210 of FIG. 4) of the vehicle black box (200 of FIG. 4) receives route guidance information from the vehicle navigation apparatus (100 of FIG. 3) (S413). The second controller (270 of FIG. 4) of the vehicle black box (200 of FIG. 4) maps image data acquired by photographing the inside and the outside of the vehicle to the received route guidance information and transmits the image data to which the received route guidance information is mapped to the vehicle navigation apparatus (100 of FIG. 3) through the second communication unit (210 of FIG. 4) (S414). The image data may be image data acquired through the vehicle black box (200 of FIG. 4) during a predetermined time period. For example, the image data may be image data having a predetermined reproduction time such as 1 minute and 5 minutes. Further, the image data may be image data having a predetermined size. For example, the image data may be image data having a predetermined size such as 1 megabyte (MB) and 5 MB.

In this case, the vehicle black box (200 of FIG. 4) may periodically transmit image data acquired by photographing the inside and the outside of the vehicle to the vehicle navigation apparatus (100 of FIG. 3), or may transmit image data to the vehicle navigation apparatus (100 of FIG. 3) according to a request of the vehicle navigation apparatus (100 of FIG. 3).

Operation of mapping image data to route guidance information will be described in detail with reference to FIG. 7.

The route guidance information may be mapped to image data using identification information of the image data. The image data identification information may include storage medium information, folder information, and file information. The storage medium information may be information for identifying a spatially separated storage device such as the vehicle navigation apparatus (100 of FIG. 3) and the vehicle black box (200 of FIG. 4), information for identifying a storage medium when a plurality of storage media exist in a single storage device such as a storage medium mounted in the vehicle navigation apparatus (100 of FIG. 3) and a storage medium detachable from the vehicle navigation apparatus (100 of FIG. 3), or information for identifying a storage medium when a storage medium is a physically single storage medium or a logically plurality of storage media. The folder information may include identification information of a storage medium at which a folder is stored, a folder generation date and time, a folder name, and folder related information. The folder related information may include information on whether a folder password is set, a folder password, upper level folder information, lower level folder information, and related folder information. The folder information may include folder information of a folder at which a file is stored, a file generation date and time, a file name, and file related information. The file related information may include information on whether a file password is set, a file password, related file information, and file attribute information. The file attribute information indicates an image data type. The image data type may include image data (hereinafter, referred to as a "first image data type") acquired according to a signal of a sensor mounted in the vehicle, image data (hereinafter, referred to as a "second image data type") acquired by a user manipulation, and image data (hereinafter, referred to as a "third image data type") acquired according to operation of the vehicle black box (200 of FIG. 4) without a sensor signal, or a user manipulation. That is, the first image data type ("event" shown in FIGS. 9, 12, and 21) indicates image data acquired by photographing the inside and the outside of the vehicle according to a signal of a sensor that detects an outside impact applied to a vehicle, detects an overspeed, sudden deceleration, and sudden acceleration of the vehicle, or detects outside noise. The second image data type ("manual" shown in FIGS. 9, 12, and 21) indicates image data acquired by photographing the inside and the outside of the vehicle according to a photographing request of a user. The third image data type ("anytime" shown in FIGS. 9, 12, and 21) indicates image data acquired by photographing the inside and the outside of the vehicle in a state in which the vehicle black box (200 of FIG. 4) normally operates without a sensor signal or a photographing request of a user.

As shown in FIG. 7A, a guide route from a starting point SP to a destination TP may be mapped to image data identification information (first image data identification information, . . . , N-th image data identification information). Such mapping information may be formed in a file separate from route guidance information and image data. That is, the mapping information may include location information to which image data is mapped among guide routes and image data identification information mapped to the location information. The mapping information may be added to route guidance information or image data instead of being formed as a separate file.

The location information includes address information, geographical name information, firm name information, point of interest (POI) information, and position information acquired using a GNSS signal. The position information includes longitude information and latitude information. Here, the address information, the geographical name information, the firm name information, and the POI information may be acquired from map data stored at the first storage unit (150 of FIG. 3) of the vehicle navigation apparatus (100 of FIG. 3) using position information acquired through the first position information module (111 of FIG. 3) of the vehicle navigation apparatus (100 of FIG. 3) or the second position information module (211 of FIG. 4) of the vehicle black box (200 of FIG. 4). In the map data, map information, address information, geographical name information, firm name information, POI information, and position information corresponding thereto is stored. Accordingly, corresponding address information, geographical name information, firm name information, and POI information may be acquired using position information. The address information is an identification symbol provided to a national institution and a public institution in order to identify a location. The address information may be an entire address like "31, Taepyeongno 1-ga, Jung-gu, Seoul", or a partial address of an entire address like "Taepyeongno 1-ga, Jung-gu, Seoul", "Yeoksam-dong", "Yeoksam-dong, Gangnam-gu", "11, Yeoksam-dong". The geographical name information is a name for identifying a village, a district, mountains and streams, and a region like "Seorae village". The firm name information is a name for representing a firm like "Lotteria" or "Starbucks" when a merchant performs business activity. The POI information indicates a well-known place like "Gwanghwamun square" or "City hall square", a subway station such as "Gangnam station" or Sadang station, or a national institution or a public institution like "Seoul city office", "Chongno-gu office". A specific place such as a "home" and "office" may be designated as POI by a user.

As shown in FIG. 7B, a guide route from a starting point SP to a destination TP may include a plurality of sub-guide routes (a first sub-guide route, a second sub-guide route, . . . , an N-th sub-guide route). The guide route may be divided into a plurality of sub-guide routes based on a segment and a time. For example, when a starting point is "Gangnam station" and a destination is an "Express bus terminal", a guide route of "Gangnam station-Express bus terminal" may be divided into a first sub-guide route of "Gangnam station-Banpo IC" and a second sub-guide route of "Banpo IC-Express bus terminal". Further, when a time point that starts from a starting point is "9:30" and an arrival scheduled time point to a destination is "10:00", a guide route may be divided into a first sub-guide route of "9:30-9:40", a second sub-guide route of "9:40-9:50", and a third sub-guide route of "9:50-10:00". A guide route may be divided into a plurality of sub-guide routes based on a relative time point that sets a starting time point as "0" instead of an absolute time point. Each sub-guide route (a first sub-guide route, a second sub-guide route, . . . , an N-th sub-guide route) may be mapped to image data identification information (first image data identification information, second image data identification information, . . . , N-th image data identification information). As described above, such mapping information may be formed into separate files, or mapping information may be added to a sub-guide route or image data.

As shown in FIG. 7C, each image data (first image data, second image data, third image data, . . . , N-th image data) may be mapped to a sub-guide route. As described above, such mapping information may be formed in a separate file, or mapping information may be added to a sub-guide route or image data.

As shown in FIG. 7D, the mapped sub-guidance route information may be added to each image data (first image data, second image data, third image data, . . . , N-th image data).

As shown in FIG. 7E, the image data includes a plurality of image frames, and the image frame may be mapped to a sub-guide route. In this case, a sub-guide route may be mapped to an image frame of a predetermined image frame type among image frames. The image frame type includes an infra (I) frame, a predicted (P) frame, and a bidirectional (B) frame. For example, a sub-guide route may be mapped to the I frame among an image frame of image data. As described above, such mapping information may be formed in a separate file, or mapping information may be added to a sub-guide route or image data.

Referring again to FIG. 6, the first controller (170 of FIG. 3) of the vehicle navigation apparatus (100 of FIG. 3) stores image data received from the vehicle black box (200 of FIG. 4) at the first storage unit (150 of FIG. 3) (S415).

Referring to FIG. 8, operation of storing image data will be described in detail.

The first controller (170 of FIG. 3) of the vehicle navigation apparatus (100 of FIG. 3) divides and stores received image data according to route guidance information mapped to the received image data. As shown in FIG. 8, the guide route is formed in a single folder, and corresponding image data may be stored into the folder.

The first controller (170 of FIG. 3) of the vehicle navigation apparatus (100 of FIG. 3) divides and stores the received image data according to acquired segment information using route guidance information mapped to the received image data. The guide route may be divided into a plurality of segments based on a segment. For example, when a starting point is "Gangnam station" and a destination "Express bus terminal", a guide route of "Gangnam station-Express bus terminal" may be divided into a first segment of "Gangnam station-Banpo IC" and a second segment of "Banpo IC-Express bus terminal". As shown in FIGS. 8B and 8C, the guide route is divided into a plurality of segments (segment A, . . . , segment M), a folder on a segment basis is generated within a guide route folder, and corresponding image data may be stored within a corresponding segment folder. In this case, the first controller (170 of FIG. 3) of the vehicle navigation apparatus (100 of FIG. 3) may store image data belonging to the same segment among received image data as a single file. Unlike that a plurality of image files (an image file 1, . . . , an image file N) are stored within a folder of a segment M shown in FIG. 8B, image data corresponding to the segment M may be stored as a single image file (an image file N) within the folder of the segment M, as shown in FIG. 8C.

The first controller (170 of FIG. 3) of the vehicle navigation apparatus (100 of FIG. 3) divides and stores image data according to time information using route guidance information mapped to the received image data. The guide route may be divided into a plurality of time segments based on a time. For example, when a time point that starts from a starting point is "9:30" and an arrival scheduled time point to the destination is "10:00", the guide route may be divided into a first time segment of "9:30-9:40", a second time segment of "9:40-9:50", and a third time segment of "9:50-10:00". As shown in FIG. 8D, the guide route is divided into a plurality of time segments (a time A, . . . , a time M), and a folder on a time segment basis is generated within a guide route folder, and corresponding image data is stored within a corresponding time segment folder. In this case, the first controller (170 of FIG. 3) of the vehicle navigation apparatus (100 of FIG. 3) may store image data belonging to the same time segment among received image data as a single file. A guide route may be divided into a plurality of time routes based on a relative time point that sets a starting time point as "0" instead of an absolute time point.

Only operation in which the vehicle navigation apparatus (100 of FIG. 3) stores image data was described above, but operation in which the vehicle black box (200 of FIG. 4) stores image data may be equally performed.

Referring again to FIG. 6, the first controller (170 of FIG. 3) of the vehicle navigation apparatus (100 of FIG. 3) outputs route guidance information mapped to received image data to the display unit (145 of FIG. 1) (S416). That is, the first controller (170 of FIG. 3) of the vehicle navigation apparatus (100 of FIG. 3) outputs a guide route, a route setting time point, and a guidance point acquired using route guidance information to the display unit (145 of FIG. 1) and outputs image data mapped to the route guidance information to the display unit (145 of FIG. 1).

As shown in FIG. 9, the image data is displayed on an image screen VS, and a guide route SPL mapped to the image data is output on a map. The image data may be output to the display unit (145 of FIG. 1) in a form of picture in picture (PIP) and navigation in picture (NIP). In order for a user to easily determine a starting point SP and a destination TP, the starting point SP and the destination TP may be output on the guide route SPL. Additional information such as the route setting time, the starting point, and the destination may be output to an additional information output area PSI. In order for the user to easily determine a photographing position of an image displayed on the image screen VS, a vehicle position VP of an image displayed on the image screen VS may be output on the guide route SPL.

In this way, by mapping and storing image data to route guidance information, when a vehicle accident occurs, information of a destination of a driver of the accident vehicle may be determined and thus the image data may be used as reference data for determining details of the vehicle accident.

Hereinafter, operation of outputting route guidance information mapped to image data according to another embodiment of the present invention will be described with reference to FIG. 10.

Figure 10:
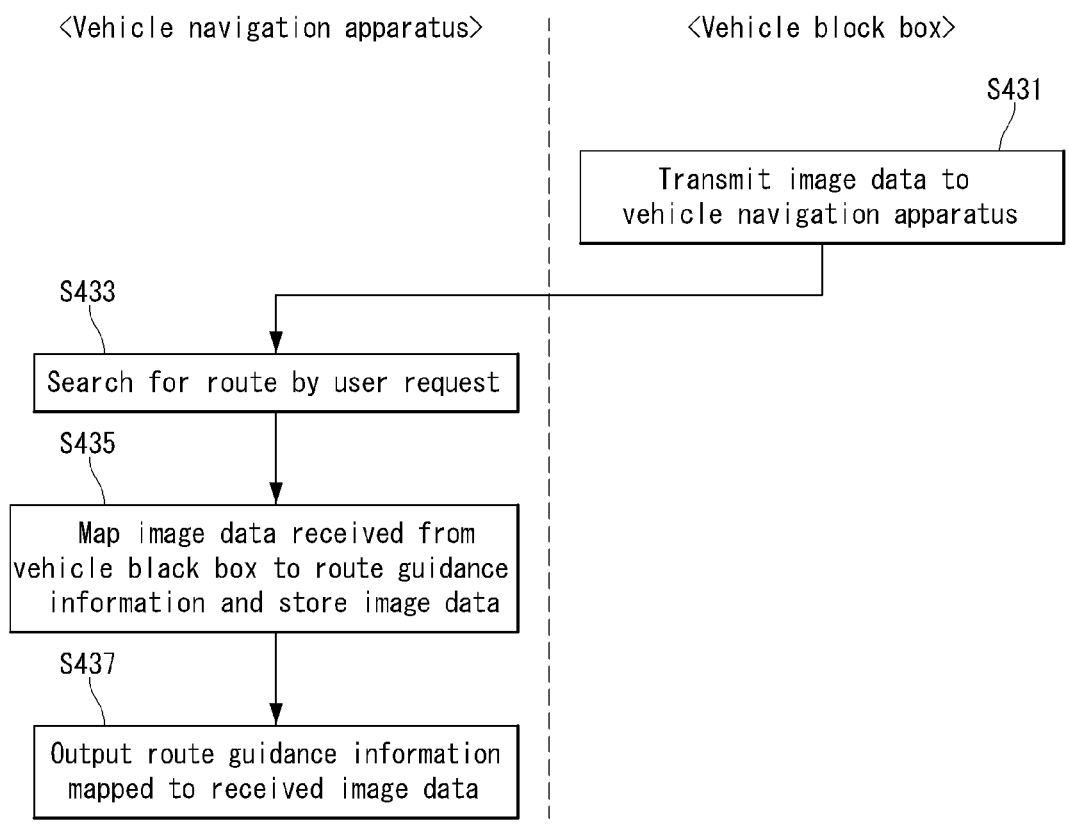
FIG. 10 is a flowchart illustrating operation of outputting route guidance information according to another embodiment of the present invention.

FIG. 10 is a flowchart illustrating operation of outputting route guidance information according to another embodiment of the present invention.

In the foregoing embodiment, the vehicle black box (200 of FIG. 4) maps route guidance information received from the vehicle navigation apparatus (100 of FIG. 3) to image data, but in the present embodiment, the vehicle navigation apparatus (100 of FIG. 3) maps image data received from the vehicle black box (200 of FIG. 4) to route guidance information.

First, the second communication unit (210 of FIG. 4) of the vehicle black box (200 of FIG. 4) transmits image data to the vehicle navigation apparatus (100 of FIG. 3) (S431). In this case, the vehicle black box (200 of FIG. 4) transmits image data acquired by photographing the inside and the outside of the vehicle to the vehicle navigation apparatus (100 of FIG. 3) periodically or according to a request of the vehicle navigation apparatus (100 of FIG. 3).

Thereafter, the first controller (170 of FIG. 3) of the vehicle navigation apparatus (100 of FIG. 3) searches for a route by a user request (S433). The first controller (170 of FIG. 3) of the vehicle navigation apparatus (100 of FIG. 3) maps image data received from the vehicle black box (200 of FIG. 4) to route guidance information and stores the image data at the first storage unit (150 of FIG. 3) (S435). Here, operation of mapping route guidance information to image data and operation of storing the image data are identical to those of the foregoing embodiment. The first controller (170 of FIG. 3) of the vehicle navigation apparatus (100 of FIG. 3) outputs the route guidance information mapped to the received image data to the display unit (145 of FIG. 1) (S437). That is, the first controller (170 of FIG. 3) of the vehicle navigation apparatus (100 of FIG. 3) outputs a guide route, a route setting time point, and a guidance point acquired using the route guidance information and the image data to the display unit (145 of FIG. 1).

Step S431 is performed before step S433, but it is not limited thereto and according to an embodiment of the present invention, step S431 may be performed after step S433.

Hereinafter, operation of outputting route guidance information mapped to image data according to another embodiment of the present invention will be described with reference to FIGS. 11 and 12.

Figure 11:
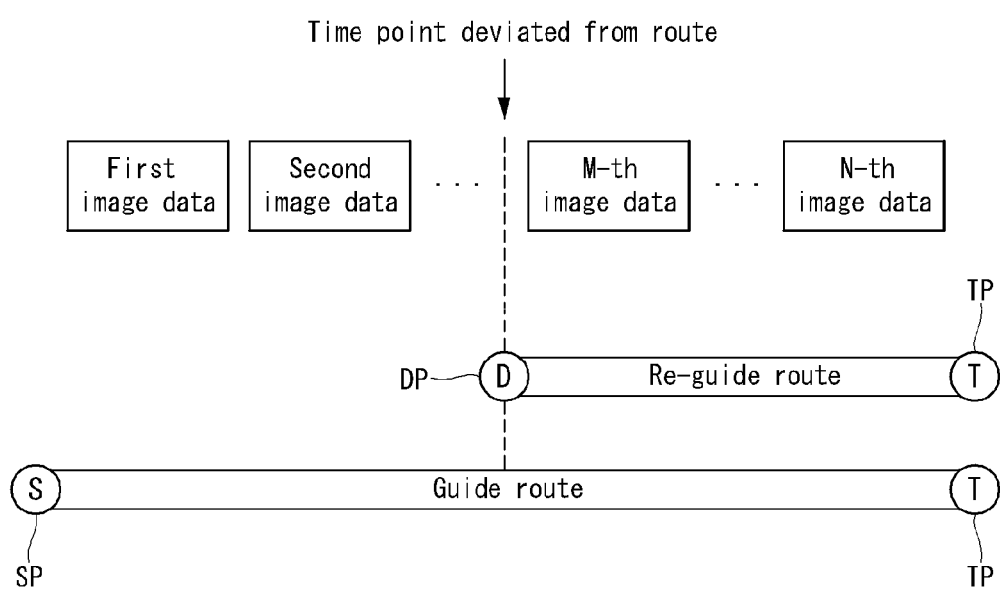
FIG. 11 is a diagram illustrating operation of mapping image data to route guidance information according to another embodiment of the present invention.
Figure 12:
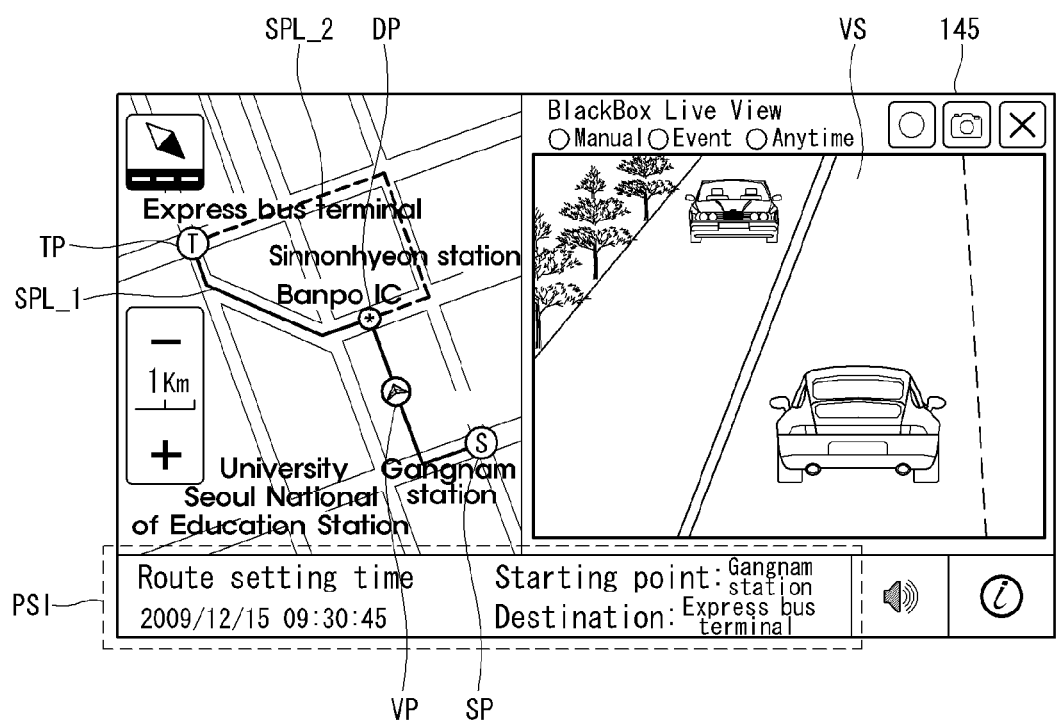
FIG. 12 illustrates an example of route guidance information output screen according to another embodiment of the present invention.

FIG. 11 is a diagram illustrating operation of mapping image data to route guidance information according to another embodiment of the present invention, and FIG. 12 illustrates an example of a route guidance information output screen according to another embodiment of the present invention.

The present embodiment is substantially identical to the foregoing embodiments and thus only a portion different from the foregoing embodiments will be described.

Route guidance information includes re-route guidance information acquired by re-searching for the route when the vehicle deviates from the route. That is, when the vehicle moves to a route different from a guide route, the route guidance information includes re-route guidance information acquired by searching for a new route from a route deviation point to a destination.

Referring to FIG. 11, when the vehicle deviates from a route at a specific time point while moving along the guide route from a starting point SP to a destination TP, the vehicle re-searches for the route from a deviation point DP to the destination TP and acquires re-guidance route information from the deviation point DP to the destination TP. Image data (first image data and second image data, . . . ) acquired before being separated from the route is mapped to a guide route from the starting point SP to the destination TP based on a route separation time point, and image data (M-th image data, . . . , N-th image data) acquired after being separated from the route may be mapped to a re-guide route from the deviation point DP to the destination TP. As in a description of the foregoing embodiments, image data is mapped to a guide route or a re-guide route and thus a detailed description thereof will be omitted. Image data before being deviating from the route and image data after being deviating from the route may be distinguished and stored based on a route separation time point. For example, image data before being deviating from the route and image data after being deviating from the route may be stored at different folders or may be stored in different files. Image data is stored like a description of the foregoing embodiments and thus a detailed description thereof will be omitted.

As shown in FIG. 12, image data is displayed on an image screen VS, and a guide route SPL_1 and a re-guide route SPL_2 mapped to the image data are output on the map. In this case, in order for a user to easily distinguish the guide route SPL_1 and the re-guide route SPL_2, a size, a color, and a kind of the guide route SPL_1 and the re-guide route SPL_2 may be differently displayed. In order for the user to easily determine a starting point SP, a deviation point DP, and a destination TP, the starting point SP, the deviation point DP, and the destination TP may be output on the guide route SPL_1 or the re-guide route SPL_2. Additional information such as a route setting time, a starting point, and a destination may be output to the additional information output area PSI. In order for the user to easily determine a photographing position of an image displayed on the image screen VS, a vehicle position VP of an image displayed on the image screen VS may be output on the guide route SPL_1 or the re-guide route SPL_2.

In this way, route guidance information includes re-route guidance information acquired by re-searching a route when the vehicle deviates from a route, and thus a guide route before and after being deviated from a route may be determined. Accordingly, as the vehicle enters a wrong route, the route may be re-searched for, and when the vehicle goes to another destination due to another business while moving to the destination, the route may be re-searched for and thus a vehicle accident occurs, the route guidance information may be used as a reference material for determining details of an accident.

Hereinafter, operation of outputting route guidance information mapped to image data according to another embodiment of the present invention will be described.

The present embodiment is substantially identical to the foregoing embodiments and thus only a portion different from the foregoing embodiments will be described.

As described above, image data received from the vehicle black box (200 of FIG. 4) may be mapped to route guidance information and be additionally mapped to location information.

First, a process of mapping image data to position information according to another embodiment of the present invention will be described with reference to FIGS. 13 to 15.

Figure 13:
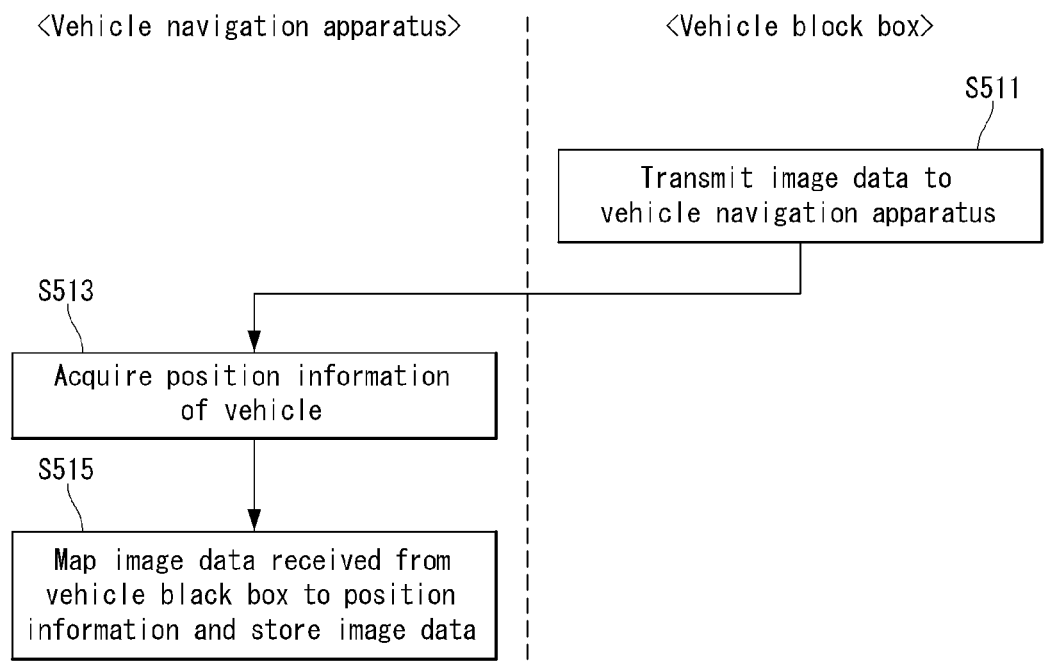
FIGS. 13 to 15 each are flowcharts illustrating an example of a process of mapping image data to position information according to another embodiment of the present invention.
Figure 14:
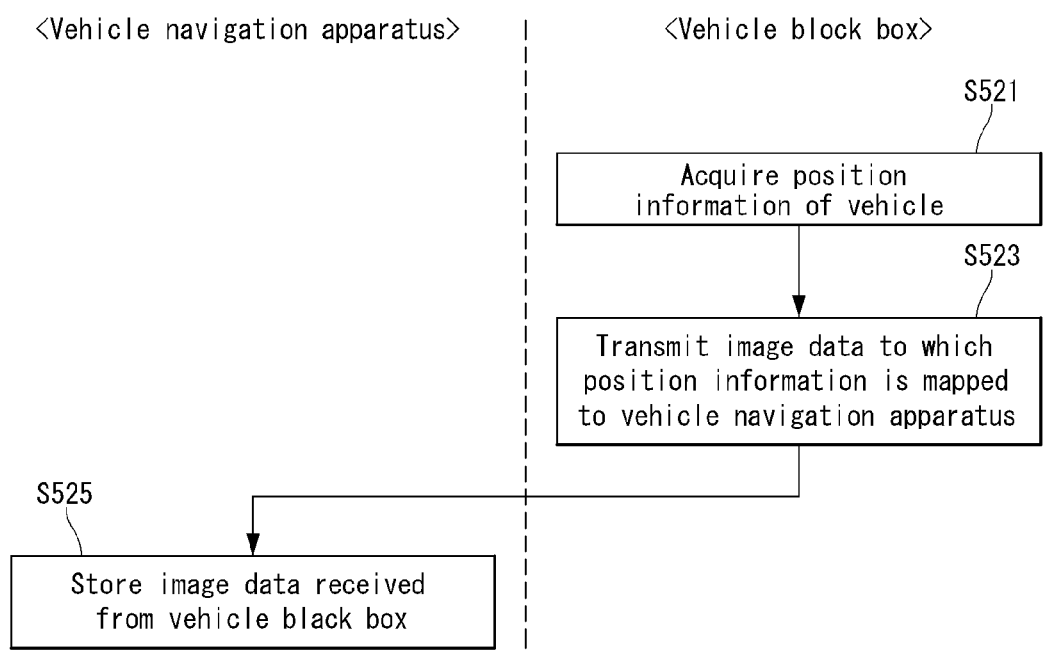
Figure 15:
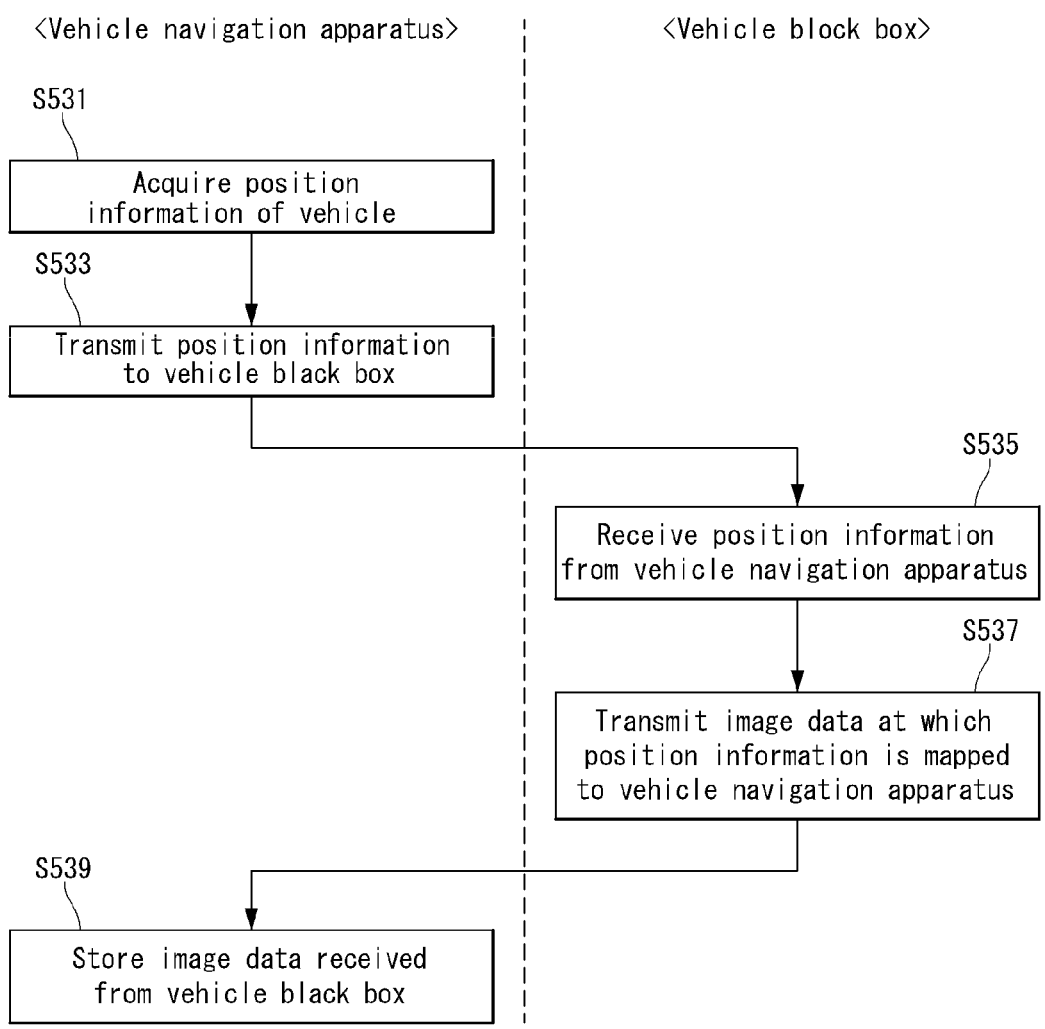

FIGS. 13 to 15 each are flowcharts illustrating an example of a process of mapping image data to position information according to another embodiment of the present invention.

An example of a process of mapping image data to position information according to another embodiment of the present invention will be described with reference to FIG. 13.

The second communication unit (210 of FIG. 4) of the vehicle black box (200 of FIG. 4) mounted in the vehicle transmits image data acquired by photographing the inside and the outside of the vehicle to the vehicle navigation apparatus (100 of FIG. 3) (S511). Thereafter, the first communication unit (110 of FIG. 3) of the vehicle navigation apparatus (100 of FIG. 3) acquires position information of the vehicle (S513), and the first controller (170 of FIG. 3) maps image data received from the vehicle black box (200 of FIG. 4) to position information and stores the image data at the first storage unit (150 of FIG. 3) (S515).

Step S513 is performed after step S511, but it is not limited thereto and according to an embodiment, step S513 may be performed before step S511, or may be simultaneously performed with step S511.

Another example of a process of mapping image data to position information according to another embodiment of the present invention will be described with reference to FIG. 14.

The second communication unit (210 of FIG. 4) of the vehicle black box (200 of FIG. 4) acquires position information of the vehicle (S521) and transmits image data to which the position information is mapped to the vehicle navigation apparatus (100 of FIG. 3) (S523). Thereafter, the first communication unit (110 of FIG. 3) of the vehicle navigation apparatus (100 of FIG. 3) receives the image data from the vehicle black box (200 of FIG. 4), and the first controller (170 of FIG. 3) stores the received image data at the first storage unit (150 of FIG. 3) (S525).

Another example of a process of mapping image data to position information according to another embodiment of the present invention will be described with reference to FIG. 15.

The first communication unit (110 of FIG. 3) of the vehicle navigation apparatus (100 of FIG. 3) acquires position information of the vehicle (S531) and transmits the position information to the vehicle black box (200 of FIG. 4) (S533). Thereafter, the second communication unit (210 of FIG. 4) of the vehicle black box (200 of FIG. 4) receives position information from the vehicle navigation apparatus (100 of FIG. 3) (S535) and transmits image data to which the received position information is mapped to the vehicle navigation apparatus (100 of FIG. 3) (S537). Thereafter, the first communication unit (110 of FIG. 3) of the vehicle navigation apparatus (100 of FIG. 3) receives the image data from the vehicle black box (200 of FIG. 4), and the first controller (170 of FIG. 3) stores the received image data at the first storage unit (150 of FIG. 3) (S539).

Next, a process of mapping image data to location information according to another embodiment of the present invention will be described with reference to FIGS. 16 to 19.

FIGS. 16 to 19 each are flowcharts illustrating an example of a process of mapping image data to location information according to another embodiment of the present invention.

Location information used in a portion that describes a process of mapping image data to location information indicates address information, geographical name information, firm name information, and POI information, except for position information acquired using a GNSS signal.

Figure 16:
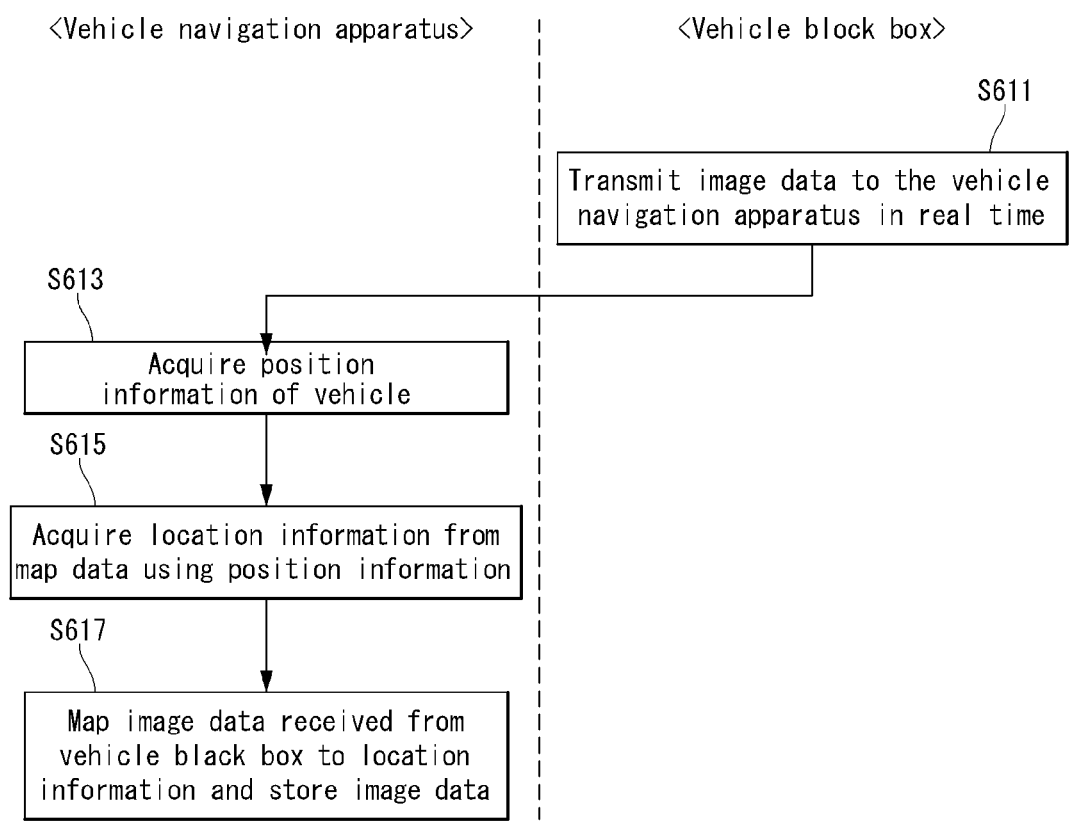
FIGS. 16 to 19 each are flowcharts illustrating an example of a process of mapping image data to location information according to another embodiment of the present invention.

An example of a process of mapping image data to location information according to another embodiment of the present invention will be described with reference to FIG. 16.

The second communication unit (210 of FIG. 4) of the vehicle black box (200 of FIG. 4) mounted in the vehicle transmits image data acquired by photographing the inside and the outside of the vehicle to the vehicle navigation apparatus (100 of FIG. 3) in real time (S611). Thereafter, the first communication unit (110 of FIG. 3) of the vehicle navigation apparatus (100 of FIG. 3) acquires present position information of the vehicle (S613), and the first controller (170 of FIG. 3) acquires location information from map data stored at the first storage unit (150 of FIG. 3) using present position information (S615). The first controller (170 of FIG. 3) of the vehicle navigation apparatus (100 of FIG. 3) maps image data received from the vehicle black box (200 of FIG. 4) to location information and stores the image data at the first storage unit (150 of FIG. 3) (S617).

Steps S613 and S615 are performed after step S611, but it is not limited thereto and according to an embodiment, steps S613 and S615 may be performed before step S611, or may be performed simultaneously with step S611.

Figure 17:
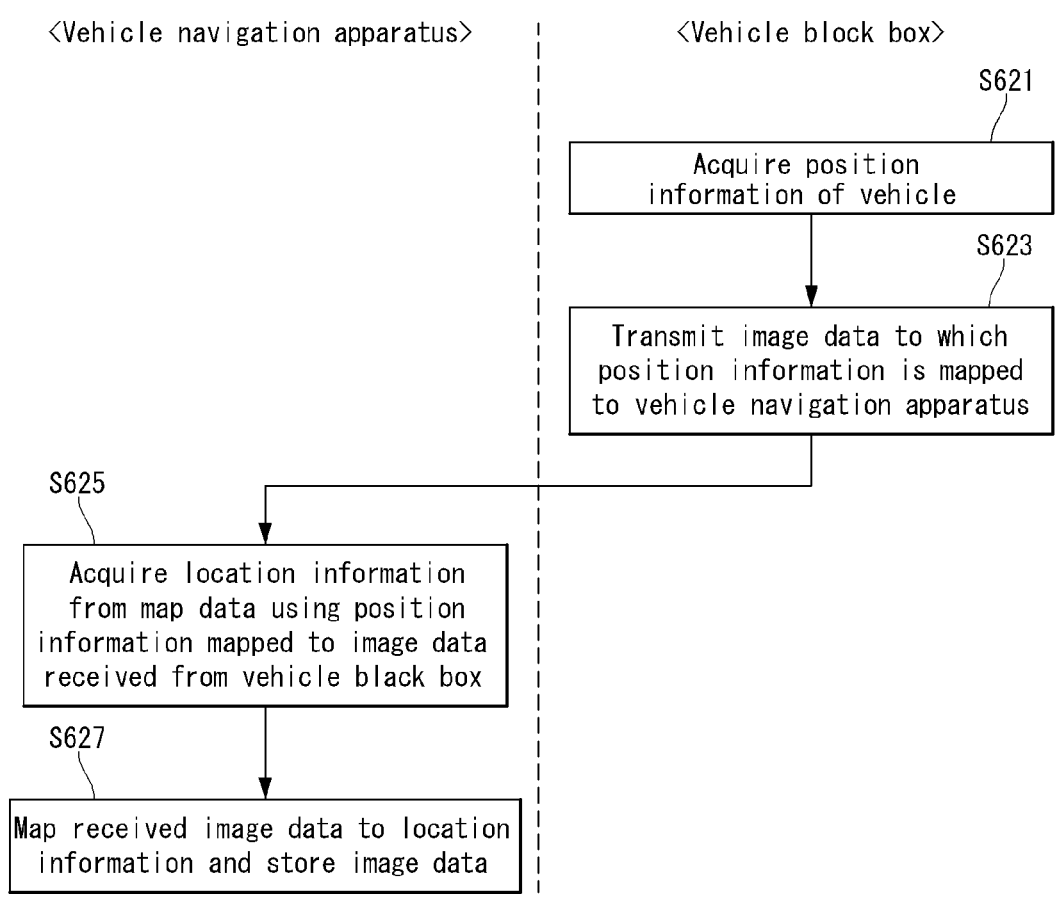

Another example of a process of mapping image data to location information according to another embodiment of the present invention will be described with reference to FIG. 17.

The second communication unit (210 of FIG. 4) of the vehicle black box (200 of FIG. 4) acquires position information of the vehicle (S621), and the second communication unit (210 of FIG. 4) transmits image data to which the position information is mapped to the vehicle navigation apparatus (100 of FIG. 3) (S623). Thereafter, the first communication unit (110 of FIG. 3) of the vehicle navigation apparatus (100 of FIG. 3) receives image data from the vehicle black box (200 of FIG. 4), and the first controller (170 of FIG. 3) acquires location information from map data stored at the first storage unit (150 of FIG. 3) using position information mapped to the received image data (S625). The first controller (170 of FIG. 3) of the vehicle navigation apparatus (100 of FIG. 3) maps the received image data to location information and stores the received image data at the first storage unit (150 of FIG. 3) (S627).

Figure 18:
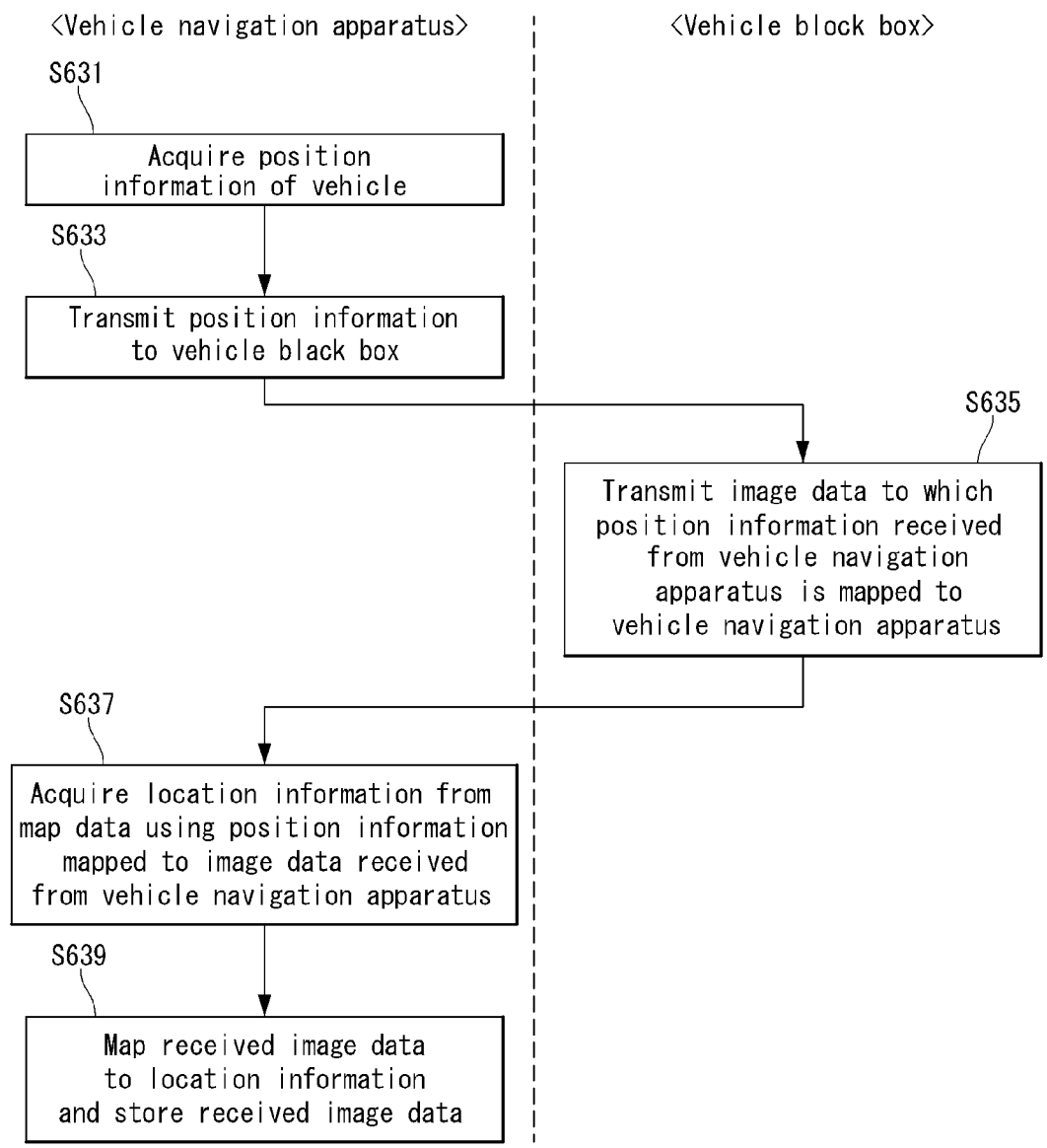

Another example of a process of mapping image data to location information according to another embodiment of the present invention will be described with reference to FIG. 18.

The first communication unit (110 of FIG. 3) of the vehicle navigation apparatus (100 of FIG. 3) acquires position information of the vehicle (S631), and the first communication unit (110 of FIG. 3) transmits the position information to the vehicle black box (200 of FIG. 4) (S633). Thereafter, the second communication unit (210 of FIG. 4) of the vehicle black box (200 of FIG. 4) receives position information from the vehicle navigation apparatus (100 of FIG. 3) and transmits image data to which the position information is mapped to the vehicle navigation apparatus (100 of FIG. 3) (S635). Thereafter, the first communication unit (110 of FIG. 3) of the vehicle navigation apparatus (100 of FIG. 3) receives the image data from the vehicle black box (200 of FIG. 4), and the first controller (170 of FIG. 3) acquires location information from map data stored at the first storage unit (150 of FIG. 3) using position information mapped to the received image data (S637). The first controller (170 of FIG. 3) of the vehicle navigation apparatus (100 of FIG. 3) maps the received image data to location information and stores the received image data at the first storage unit (150 of FIG. 3) (S639).

Figure 19:
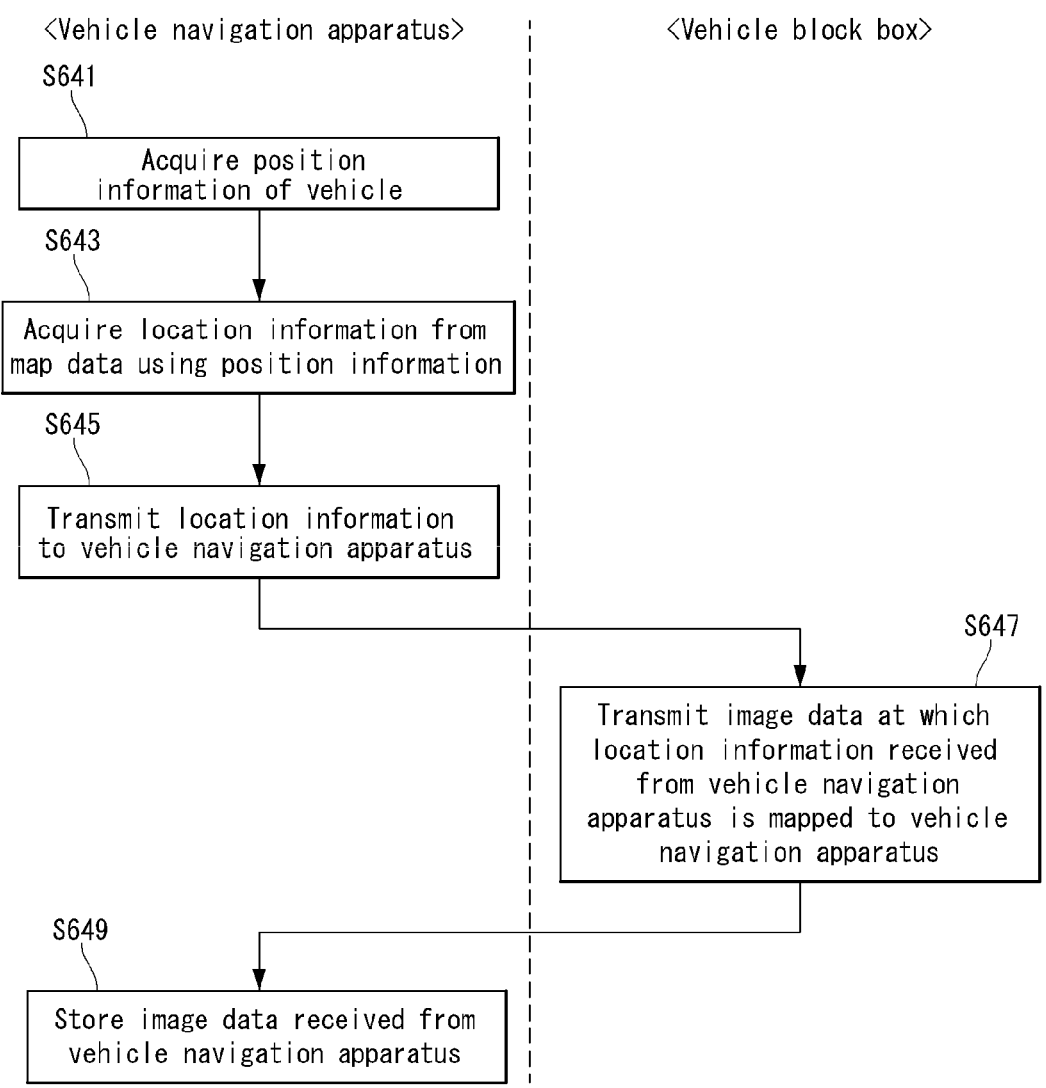

Another example of a process of mapping image data to location information according to another embodiment of the present invention will be described with reference to FIG. 19.

The first communication unit (110 of FIG. 3) of the vehicle navigation apparatus (100 of FIG. 3) acquires position information of the vehicle (S641), and the first controller (170 of FIG. 3) acquires location information from map data stored at the first storage unit (150 of FIG. 3) using position information (S643). Thereafter, the first controller (170 of FIG. 3) of the vehicle navigation apparatus (100 of FIG. 3) transmits the location information to the vehicle black box (200 of FIG. 4) through the first communication unit (110 of FIG. 3) (S645). Thereafter, the second communication unit (210 of FIG. 4) of the vehicle black box (200 of FIG. 4) receives the location information from the vehicle navigation apparatus (100 of FIG. 3) and transmits the image data to which the location information is mapped to the vehicle navigation apparatus (100 of FIG. 3) (S647). Thereafter, the first communication unit (110 of FIG. 3) of the vehicle navigation apparatus (100 of FIG. 3) receives the image data from the vehicle black box (200 of FIG. 4), and the first controller (170 of FIG. 3) stores the image data at the first storage unit (150 of FIG. 3) (S649).

Hereinafter, operation of outputting route guidance information and trace information according to another embodiment of the present invention will be described with reference to FIGS. 20 and 21.

Figure 20:
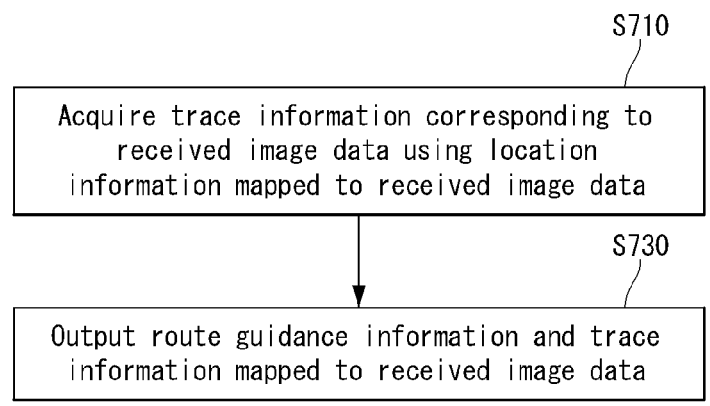
FIG. 20 is a flowchart illustrating operation of outputting route guidance information and trace information according to another embodiment of the present invention.
Figure 21:
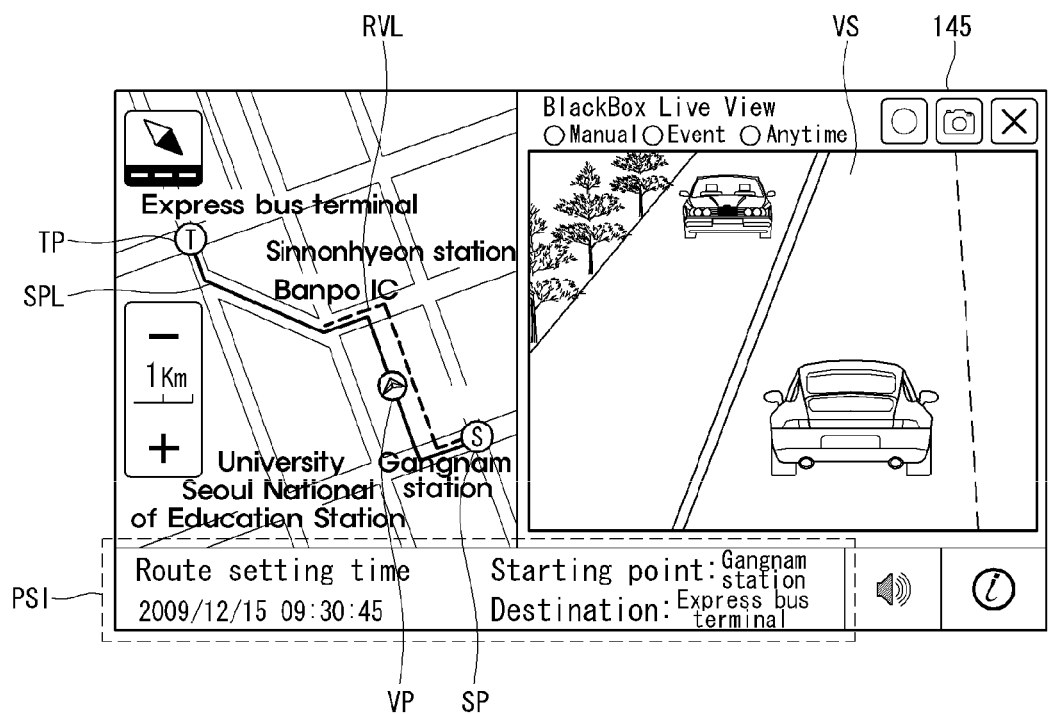
FIG. 21 illustrates an example of a route guidance information output screen according to another embodiment of the present invention.

FIG. 20 is a flowchart illustrating operation of outputting route guidance information and trace information according to another embodiment of the present invention, and FIG. 21 illustrates an example of a route guidance information output screen according to another embodiment of the present invention.

The first controller (170 of FIG. 3) of the vehicle navigation apparatus (100 of FIG. 3) acquires trace information corresponding to received image data using location information mapped to image data received from the vehicle black box (200 of FIG. 4) (S710). That is, the first controller 170 acquires a vehicle moving trace corresponding to image data using a plurality of location information mapped to the image data. As described above, the location information may include address information, geographical name information, firm name information, POI information, and position information.

Thereafter, the first controller (170 of FIG. 3) of the vehicle navigation apparatus (100 of FIG. 3) controls to output route guidance information mapped to the received image data and trace information corresponding to the image data to the display unit (145 of FIG. 1) (S730). As shown in FIG. 21, the image data is displayed on the image screen VS, and a guide route SPL mapped to the image data is output on a map. A vehicle trace RVL based on trace information may be output on a map. In this case, in order to the user to easily distinguish the guide route SPL and the vehicle trace RVL, a size, a color, and a kind of the guide route SPL and the vehicle trace RVL may be differently displayed. In order for the user to easily determine a starting point SP and a destination TP, the starting point SP and the destination TP may be output on the guide route SPL. Additional information such as a route setting time, a starting point, and a destination may be output at the additional information output area PSI. In order for the user to easily determine a photographed position of an image displayed on the image screen VS, a vehicle position VP corresponding to an image displayed on the image screen VS may be output on the guide route SPL. Referring to FIG. 21, it can be seen that the vehicle trace RVL is terminated on the way of the guide route SPL from the starting point SP to the destination TP. Accordingly, the user can know that a problem such as a vehicle accident occurs at a point at which the vehicle trace RVL is terminated.

In this way, because route guidance information and trace information is together output, an actual moving trace of a vehicle as well as information such as a destination of a driver may be determined.

The route guidance information output screen shown in FIGS. 9, 12, and 21 is one example and may be formed in different forms.

Image data to which route guidance information is mapped is stored at the vehicle navigation apparatus (100 of FIG. 3) or the vehicle black box (200 of FIG. 4), but it is not limited thereto, and according to an embodiment, the vehicle navigation apparatus (100 of FIG. 3) or the vehicle black box (200 of FIG. 4) may transmit image data to which route guidance information is mapped to electronic devices (61 and 62 of FIG. 5) through the network (30 of FIG. 5). Thereafter, the electronic devices (61 and 62 of FIG. 5) store image data that receives from the vehicle navigation apparatus (100 of FIG. 3) or the vehicle black box (200 of FIG. 4). The electronic devices (61 and 62 of FIG. 5) transmit corresponding image data to the vehicle navigation apparatus (100 of FIG. 3) or the vehicle black box (200 of FIG. 4) according to a request of the vehicle navigation apparatus (100 of FIG. 3) or the vehicle black box (200 of FIG. 4).

An embodiment of the present invention includes a computer readable medium including a program command for executing operation embodied with various computers. The medium records a program for executing a method of controlling a vehicle navigation apparatus described above. The medium may include a program command, a data file, and a data structure individually or in combination. An example of such a medium may include magnetic media such as a hard disk, a floppy disk, and a magnetic tape, optical recording media such as a CD and a DVD, and a hardware device formed to store and execute a program command such as a ROM, a RAM, and a flash memory. An example of a program command includes a high-level language code that can be executed by a computer using an interpreter as well as a machine language code made by a compiler.

While the present invention has been particularly shown and described with reference to embodiments thereof, it will be understood by those of ordinary skill in the art that various changes in form and details may be made therein without departing from the spirit and scope of the present invention as defined by the following claims.

INDUSTRIAL APPLICABILITY

According to the present invention, a vehicle navigation apparatus, a method of controlling the vehicle navigation apparatus, and a vehicle black box that can map and provide image data photographed through the black box to route guidance information can be provided.

What is claimed is:

1. A vehicle navigation apparatus for a vehicle comprising: a storage unit;
a communication unit configured to receive image data from a vehicle black box mounted in the vehicle; and
a controller configured to map the received image data to route guidance information and store the received image data at the storage unit,
wherein the route guidance information comprises a plurality of sub-route guidance information each of which corresponds to a respective division of the route guidance information,
wherein the image data are captured by the vehicle black box while the vehicle is driven along the route according to guidance information and divided into a plurality of captured image data each of which has a predetermined recoding time interval or a predetermined file size, and
wherein the controller maps the received image data to route guidance information in such a way that one or more captured image data of the plurality of captured image data correspond to one or more sub-route guidance information of the plurality of sub-route guidance information.

2. The navigation apparatus of claim 1, wherein the controller is configured to map each of the plurality of sub-route guidance information to the received image data using identification information of the captured image data.

3. The navigation apparatus of claim 2, wherein the controller is configured to map the first and second sub-route guidance information to identification information of the captured image data one-to-one.

4. The navigation apparatus of claim 1, wherein the controller is configured to store the plurality of captured image data each of which the corresponding sub-route guidance information is included into.

5. The vehicle navigation apparatus of claim 1, wherein the captured image data comprises a plurality of image frames, and the controller is configured to map one or more image frame to the sub-route guidance information.

6. The navigation apparatus of claim 1, wherein the route guidance information comprises route setting time information, which is a time point to which a route found by a user request is set.

7. The navigation apparatus of claim 1, wherein the controller is configured to divide the received image data according to the route guidance information mapped to the received image data and to store separately the divided image data at the storage unit.

8. The navigation apparatus of claim 7, wherein the controller is configured to divide the received image data according to acquired segment information using the route guidance information mapped to the received image data and to store the divided image data at the storage unit.

9. The navigation apparatus of claim 1, further comprising a display unit, wherein the controller is configured to output the route guidance information mapped to the received image data to the display unit.

10. The navigation apparatus of claim 1, wherein the received image data is mapped to location information, and the controller is configured to acquire trace information corresponding to the received image data using the location information mapped to the received image data.

11. A black box for a vehicle comprising a storage unit, a communication unit configured to receive route guidance information from a vehicle navigation apparatus mounted in the vehicle; and a controller configured to map image data acquired by photographing the inside and the outside of the vehicle to the route guidance information and to store the image data at the storage unit, wherein the route guidance information comprises a plurality of sub-route guidance information each of which corresponds to a respective division of the route guidance information, wherein the image data are captured by the vehicle black box while the vehicle is driven along the route according to guidance information and divided into a plurality of captured image data each of which has a predetermined recoding time interval or a predetermined file size, and wherein the controller maps the received image data to route guidance information in such a way that one or more captured image data of the plurality of captured image data correspond to one or more sub-route guidance information of the plurality of sub-route guidance information.

12. The black box of claim 11, wherein the controller is configured to map each of the plurality of sub-route guidance information to the image data using identification information of the captured image data.

13. The black box of claim 12, wherein the captured image data identification information comprises at least one of storage medium information, folder information, and file information.

14. The black box of claim 12, wherein the controller is configured to map the sub-route guidance information to identification Information of the captured image data one-to-one.

15. The black box of claim 11, wherein the controller is configured to store the plurality of captured image data each of which the corresponding is included into.

16. The black box of claim 11, wherein the captured image data comprises a plurality of image frames, and the controller is configured to map one or more image frame to the sub-route guidance information.

17. The black box of claim 11, wherein the received route guidance information comprises re-route guidance information acquired by re-searching when the vehicle deviates from the route.

18. The black box of claim 17, wherein the image data comprises image data before being deviated from the route and image data after being deviated from the route, and the controller is configured to distinguish and separately store the image data before being deviated from the route and the image data after being deviated from the route.

19. The black box of claim 18, wherein the controller is configured to store the image data before being deviated from the route and the image data after being deviated from the route at different folders.

20. The black box of claim 18, wherein the controller is configured to store the image data before being deviated from the route and the image data after being deviated from the route as different files.

21. The black box of claim 11, wherein the received route guidance information comprises route setting time information, which is a time point in which a route found by a user request is set.

22. The black box of claim 11, wherein the controller is configured to divide the image data according to the received route guidance information and store separately the divided image data at the storage unit.

23. The black box of claim 22, wherein the controller is configured to divide the image data according to segment information acquired using the received route guidance information and to store separately the divided image data at the storage unit.

24. The black box of claim 22, wherein the controller is configured to store image data belonging to the same segment among the image data as a single file.

25. The black box of claim 11, wherein the controller is configured to transmit the image data to which the received route guidance information is mapped to the vehicle navigation apparatus through the communication unit.

26. The black box of claim 11, wherein the controller is configured to map the image data to location information.

* * * * *